(12) United States Patent
Lin

(10) Patent No.: US 10,265,709 B2
(45) Date of Patent: Apr. 23, 2019

(54) INDUCTIVE SHOWERHEAD AND MULTI-WATERWAY SWITCHING MECHANISM

(71) Applicant: Hongxin Lin, Taizhou (CN)

(72) Inventor: Hongxin Lin, Taizhou (CN)

(73) Assignee: Zhejiang Huale Technology Co., Ltd., Taizhou (CN)

(*) Notice: Subject to any disclaimer, the term of this patent is extended or adjusted under 35 U.S.C. 154(b) by 228 days.

(21) Appl. No.: 15/132,299

(22) Filed: Apr. 19, 2016

(65) Prior Publication Data
US 2017/0087563 A1    Mar. 30, 2017

(30) Foreign Application Priority Data

Sep. 25, 2015 (CN) .......................... 2015 1 0624424
Mar. 24, 2016 (CN) .......................... 2016 1 0177061
Mar. 24, 2016 (CN) .......................... 2016 1 0178824

(51) Int. Cl.
| | |
|---|---|
| B05B 1/16 | (2006.01) |
| B05B 1/18 | (2006.01) |
| F16K 3/26 | (2006.01) |
| F16K 31/06 | (2006.01) |
| B05B 1/30 | (2006.01) |
| F16K 11/18 | (2006.01) |
| F16K 11/24 | (2006.01) |
| F16K 11/044 | (2006.01) |

(52) U.S. Cl.
CPC ............ *B05B 1/1636* (2013.01); *B05B 1/169* (2013.01); *B05B 1/1609* (2013.01); *B05B 1/1681* (2013.01); *B05B 1/18* (2013.01); *B05B 1/3006* (2013.01); *F16K 3/267* (2013.01); *F16K 11/044* (2013.01); *F16K 11/18* (2013.01); *F16K 11/24* (2013.01); *F16K 31/0644* (2013.01)

(58) Field of Classification Search
CPC ... B05B 1/1636; B05B 1/1609; B05B 1/1681; B05B 1/169; B05B 1/18; B05B 1/3006; F16K 3/267; F16K 11/044; F16K 11/18; F16K 11/24
USPC .............................................. 251/30.03, 30.04
See application file for complete search history.

(56) References Cited

U.S. PATENT DOCUMENTS 3,306,570 A * 2/1967 Cooksley .............. F16K 31/406
                                                   137/606

* cited by examiner

*Primary Examiner* — Alexander M Valvis
*Assistant Examiner* — Christopher R Dandridge
(74) *Attorney, Agent, or Firm* — Minder Law Group; Willy H. Wong

(57) ABSTRACT

An inductive shower head, comprising an outer shell which is provided with a water inlet and multiple groups of water outlet holes; a third water outlet cavity and a first water outlet cavity which are independent of each other inside the outer shell can be communicated with the corresponding groups of the water outlet holes respectively, a third water inlet cavity is arranged between the first water inlet cavity and the third water outlet cavity; the first water inlet cavity is communicated with the third water inlet cavity; the position where the third water inlet cavity is communicated with the third water outlet cavity is correspondingly provided with a control assembly which uses an electromagnet to control the two cavities to communicate with or block from each other; the shower head also comprises a first inductor and a power supply unit which is used for supplying power to the electromagnet.

9 Claims, 17 Drawing Sheets

INDUCTIVE SHOWERHEAD AND MULTI-WATERWAY SWITCHING MECHANISM

RELATED APPLICATIONS

This application claims benefit to Chinese Patent Application No. CN201510624424.X, filed Sep. 25, 2015; CN201610178824.7, filed Mar. 24, 2016; and CN201610177061.4, filed Mar. 24, 2016.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to a showerhead and a multi-waterway switching mechanism in the field of shower installations, in particular to an inductive showerhead which adopts the multi-waterway switching mechanism.

Related Art

The showerhead is referred to the spray head used for showering, and can generally be classified into three types according to different usage: 1) handheld showerhead: the showerhead can be held in hand to shower freely, and the showerhead support boasts the fixation function; 2) overhead showerhead: the showerhead head is fixed at the overhead position, and the support is embedded into the wall, so the descending function is not provided; however, the showerhead head is provided with a small movable ball used for adjusting the water-discharging angle, and the angle for upward and downward movements is relatively flexible; 3) postural showerhead; the showerhead is concealed in the wall to spray the body in a sideway manner, and various installation positions and water-spraying angles are available, so that the cleaning and massaging function can be achieved.

The structure of the showerhead generally comprises an outer shell provided with a water inlet and a water outlet. The water outlet on the outer shell is fixedly connected with a water-discharging panel. Multiple water outlet holes are evenly distributed in the water-discharging panel. Water flows into the water inlet of the showerhead, and then flows out from the water outlet holes in the water-discharging panel. In order to achieve various water-discharging functions on the showerhead, the water outlet holes in the water-discharging panel are divided into multiple groups in prior art showerheads. Each group is consisted of multiple water outlet holes. When a specific water-discharging function needs to be achieved, the waterway in the showerhead can be switched by operating a switching handle at one side of the showerhead, so that the corresponding group of the water outlet holes are communicated with the water inlet and water is discharged. At this moment, water does not flow out of the other groups of the water outlet holes. If the water-discharging function needs to be switched, then it can be achieved by flipping the switching handle once again. However, the waterway-switching methods of the prior art showerheads is inconvenient to operate, especially when the handle is difficult to reach due to the fact that the installation position of the handle is either too high or too low, or when sometimes the user can not open his or her eyes after applying soap.

In response to this circumstance, some people in the field of shower installations have also adopted the inductive control method to switch the way how water is discharged, but the problems that the structure is complex and the reliability is poor still remain.

SUMMARY OF THE INVENTION

It is an object of a preferred embodiment of the invention to address the problems existing in the prior art, and the preferred embodiment provides the inductive showerhead and the inductive showerhead which adopts the multi-waterway switching mechanism for discharging water, so that the reliability of the inductive showerhead is improved and the structure of the inductive showerhead is simplified.

The object of a preferred embodiment of the invention can be achieved through the following technical schemes:

An inductive showerhead, comprising the outer shell which is provided with the water inlet and multiple groups of water outlet holes; each group of the water outlet holes is positioned differently; the inside of the outer shell is provided with the first water inlet cavity, the third water outlet cavity and the first water outlet cavity, wherein the first water inlet cavity is communicated with the water inlet, and the third water outlet cavity and the first water outlet cavity which are independent of each other; the third water outlet cavity and the first water outlet cavity can be communicated with the corresponding groups of the water outlet holes respectively. The inductive showerhead is characterized in that the third water inlet cavity is arranged between the first water inlet cavity and the third water outlet cavity; the first water inlet cavity is communicated with the third water inlet cavity; the position where the third water inlet cavity is communicated with the third water outlet cavity is correspondingly provided with a control assembly which uses an electromagnet to control the two cavities to communicate with or block from each other; the showerhead also comprises the first inductor and the power supply unit which is used for supplying power to the electromagnet; the control assembly can block or connect the third water inlet cavity and the third water outlet cavity based on the inductive signal from the first inductor; the position where the first water inlet cavity is communicated with the first water outlet cavity is further provided with the first switching core; when the first water inlet cavity is communicated with the third water outlet cavity and water flows out, the first switching core drives the first sealing part to block the first water inlet cavity and the first water outlet cavity due to water pressure inside the first water inlet cavity; when the first water inlet cavity is blocked from the third water outlet cavity, the first switching core drives the first sealing part to move due to water pressure inside the first water inlet cavity so that the first water inlet cavity can be communicated with the first water outlet cavity.

When the inductive showerhead is being used, the automatic control over the waterway switching is achieved by the control assembly based on the inductive signal from the first inductor. Particularly, when water needs to be discharged from the third water outlet cavity, the electromagnet in the control assembly acts on the control assembly to open the water inlet end of the third water outlet cavity, water at the first water inlet cavity sequentially flows through the third water inlet cavity and the third water outlet cavity to be discharged. Due to the fact that water at the first water inlet cavity flows towards the third water outlet cavity to be discharged, the differential water pressure is formed between the first water inlet cavity and the third water outlet cavity, and then the first switching core can act to block the first water inlet cavity and the first water outlet cavity under the water pressure of the first water inlet cavity; Conversely, when the electromagnet acts to block the first water inlet cavity from the third water outlet cavity, the water pressure inside the first water inlet cavity is huge, and then the water pressure in the first water inlet cavity pushes the first switching core to move in the direction of the first water outlet cavity; therefore, the first water inlet cavity is communicated with the first water outlet cavity, and then water in the first water inlet cavity is discharged through the first water outlet cavity. In another word, one independent control assembly can control the switching between two waterways based on the inductive signal from the inductor, and the first water outlet cavity can be opened or blocked by arranging one switching core at the first water outlet cavity. The structure is simple, and the production cost is low. In addition, the third water outlet cavity and the first water outlet cavity are independent of each other, so that the circumstance where the pressure control cavities are communicated does not occur. Therefore, the requirement for processing precision which affects the sealing performance is lowered, the reliability is good, and the production cost is further lowered.

In the above inductive showerhead, the position, inside the outer shell, where the first water inlet cavity is communicated with the first water outlet cavity is provided with the protruding annular first retaining shoulder; the first switching core is arranged in the first retaining shoulder in a penetrating mode; the inner end and the outer end of the first switching core are positioned in the first water inlet cavity and the first water outlet cavity respectively; the inner end of the first switching core is provided with the tabular first stress plate which protrudes out of the outer side wall of the inner end; the outer end of the first switching core is fixedly connected with the first sealing part which can be abutted against the first retaining shoulder to achieve the sealing effect. When water is discharged from the third water outlet cavity, the differential water pressure is formed between the first water inlet cavity and the third water outlet cavity, and the acting force of the greater water pressure inside the first water inlet cavity is exerted onto the first stress plate of the first switching core; the first switching core is driven to move in the direction of the inner end, and then the first sealing part at the outer end of the first switching core is driven to be abutted against the first retaining shoulder to achieve the sealing effect, so that the first water inlet cavity is blocked from the first water outlet cavity; conversely, if water does not flow out of the third water outlet cavity, then the water pressure inside the first water inlet cavity is huge; the first switching core is driven to move in the direction of the outer end, and then the first sealing part is driven to move away from the first retaining shoulder, so that the first water inlet cavity is communicated with the first water outlet cavity. The whole working process of the first switching core is driven by the water pressure without needing other driving structures, so that the structure is simple, the energy consumption is lowered, and the production cost is further lowered.

In the above inductive showerhead, the inside of the outer shell is further provided with the first elastic part whose two ends are abutted against the first stress plate and the first retaining shoulder respectively; under the elastic effect of the first elastic part, the first switching core can drive the first sealing part to abut against the first retaining shoulder to achieve the sealing effect. By adding the first elastic part to assist the action of the first switching core, the action of the first switching core is more stable, and the utilization reliability is improved.

In the above inductive showerhead, the first switching core comprises the rod-shaped or barrel-shaped first connecting part which is arranged in the first retaining shoulder in a penetrating mode; the first stress plate is in the shape of a ring or a disk, and is coaxially arranged at the inner end of the first connecting part; the first sealing part is fixedly connected with the outer side wall at the outer end of the first connecting part. Here, barrel-shaped means the whole body is in the shape of a barrel with one closed end; the first connecting part is arranged in the first retaining shoulder in a penetrating mode, and guides the action of the first switching core to communicate or block the first water inlet cavity and the first water outlet cavity, so that the first switching core is prevented from deviating when moving, and the sealing reliability is guaranteed.

In the above inductive showerhead, an annular groove is formed in the outer side wall at the outer end of the first connecting part surrounding the axis of the first connecting part; the first sealing part is in the shape of a ring, and is arranged inside the groove. The first sealing part can be of the structures such as an O-shaped ring or an annular gasket, and the first sealing part is arranged in the annular groove; compared to other fixation methods, the circumstance where the first sealing part is loosened due to the impact of the water flow after being used for a long time can be better prevented, and the utilization reliability of the inductive showerhead is further improved.

In the above inductive showerhead, the control assembly comprises the third pressure control cavity placed at the position where the third water inlet cavity is communicated with the third water outlet cavity, the third sealing gasket that is connected to the third pressure control cavity, the third driving part and the barrel-shaped third pressure-relieving part; the third pressure-relieving part is arranged in the middle of the third sealing gasket in a penetrating mode, and the inner side wall of the third sealing gasket is closely abutted against the outer side wall of the third pressure-relieving part; the inner side of the third pressure-relieving part is the third pressure-relieving hole which can be used for communicating the third pressure control cavity with the third water outlet cavity; the third driving part can block the opening, positioned at the side near the third pressure control cavity, on the third pressure-relieving hole; the third water inlet channel, capable of communicating the first water inlet cavity with the third pressure control cavity, is further formed in the third sealing gasket in a penetrating mode; the cross-sectional area of the third water inlet channel is less than that of the third pressure-relieving hole.

When the third pressure-relieving hole is blocked by the third driving part, water inside the first water inlet cavity flows into the third pressure control cavity through the third water inlet cavity and the third water inlet channel, and the water pressure between the third pressure control cavity and the third water inlet cavity; the water inlet end of the third water outlet cavity is blocked by the third sealing gasket, and then water does not flow out of the third water outlet cavity. Conversely, if the third pressure-relieving hole is not blocked by the third driving part, and the third pressure-relieving hole is in the open state, then water inside the third pressure control cavity flows into the third water outlet cavity through the third pressure-relieving hole; due to the fact that the largest cross-sectional area at the third water inlet channel is smaller than the smallest of the third pressure-relieving hole, the water-supplementing speed in the third pressure control cavity is lower than the water-discharging speed, and then the water pressure in the third pressure control cavity decreases gradually; the third sealing gasket moves away from the water inlet end of the third water outlet cavity due to the water pressure in the third water inlet cavity, so that the third water inlet cavity is communicated with the third water outlet cavity, and then water is directly discharged through the water inlet end of the third water outlet cavity. Here, the cross-sectional area of the opening at the water inlet end of the third water outlet cavity is greater than that of the third pressure-relieving hole. Furthermore, the control assembly may just be an electromagnet as well.

In the above inductive showerhead, the third water inlet hole, capable of communicating the third water inlet cavity with the third pressure control cavity, is formed in the third sealing gasket in a penetrating mode; the outer shell is further provided with the protruding third current-limiting column which is arranged in the third water inlet hole in a penetrating mode; the third water inlet channel is formed between the outer side wall of the third current-limiting column and the side wall of the third water inlet hole. Due to the fact that the third sealing gasket, the third pressure control cavity, the third elastic part and other structures are all arranged in the outer shell of the showerhead, considering the volume of the showerhead, the volume of the third sealing gasket is small, and the third sealing gasket is made of rubber materials; a hole which is smaller than the third pressure-relieving hole needs to be formed in the third sealing gasket during the processing process, and due to the fact that the third sealing gasket is made of the rubber materials, the third sealing gasket will retract to be blocked again if the drilled hole is too small, so the requirement for the overall processing precision is high; however, by adopting the method in which the third current-limiting column is arranged in the third water inlet hole in a penetrating mode to form the third water inlet channel, the requirement for the processing precision is greatly lowered, and the production cost is lowered. Meanwhile, conditions such as deformation or aging may occur on the third sealing gasket which is made of the rubber materials after being used for a long time; if a hole is formed in the third sealing gasket just to be used as the third water inlet channel, then the hole can be enlarged due to long-term usage, so the normal operation at the third pressure control cavity is affected; this circumstance can be prevented to a great extent by arranging the third current-limiting column in a penetrating mode, so that the utilization reliability is improved.

In the above inductive showerhead, one end of the third pressure-relieving part penetrates through the third sealing gasket, and is positioned inside the third water outlet cavity; this end of the third pressure-relieving part is connected with the third limiting head which protrudes out of the outer side wall of the third pressure-relieving part. By arranging the third limiting head, the third sealing gasket which is arranged on the outer side of the third pressure-relieving part in a sleeving mode is prevented from coming off from the end of the third pressure-relieving part, and the normal operation of the third sealing gasket is guaranteed.

In the above inductive showerhead, the fifth water outlet cavity is further arranged in the outer shell; the fifth water outlet cavity is communicated with the corresponding group of the water outlet holes; the fifth water inlet cavity is arranged between the first water inlet cavity and the fifth water outlet cavity; and the first water inlet cavity is communicated with the fifth water inlet cavity; the position where the fifth water inlet cavity is communicated with the fifth water outlet cavity is provided with the control assembly; the fifth water inlet cavity can be communicated with or blocked from the fifth water outlet cavity by the control assembly based on the inductive signal from the first inductor; when the first water inlet cavity is communicated with the third water outlet cavity or the fifth water outlet cavity and water flows out, the first switching core can block the communication between the first water inlet cavity and the first water outlet cavity; when the third water inlet cavity is blocked from the third water outlet cavity, and the fifth water inlet cavity is blocked from the fifth water outlet cavity, then the first switching core can communicate the first water inlet cavity with the first water outlet cavity due to the water pressure inside the first water inlet cavity.

The structure at the fifth water outlet cavity is identical to that at the third water outlet cavity; the first water inlet cavity can be communicated to the fifth water outlet cavity; the fifth water outlet cavity is controlled by the control assembly to block or discharge the water. When water is discharged from the third water outlet cavity or the fifth water outlet cavity, water does not flow out of the first water outlet cavity; When water is not discharged from the third water outlet cavity and the fifth water outlet cavity, water flows out of the first water outlet cavity; in another word, the control over the switching among three waterways can be achieved through the electromagnets in two control assemblies. Of course, the same water outlet cavity and the corresponding structure can be increased again based on the needs, and the first water inlet cavity is similarly communicated to the water outlet cavity, therefore, the control over the switching of more waterways can be achieved. In the structure formed like this, all pressure control cavities and all the water outlet cavities are mutually independent, so the mutual influence between them is prevented, the requirement for processing precision is low, the production cost is lowered, and the utilization reliability is improved.

In the above inductive showerhead, the second water inlet cavity, the fourth water outlet cavity and the second water outlet cavity are further arranged in the outer shell, wherein the fourth water outlet cavity and the second water outlet cavity are independent of each other; the water outlet end of the third water outlet cavity or the first water outlet cavity is communicated with the second water inlet cavity; the fourth water outlet cavity and the second water outlet cavity can be communicated with the corresponding groups of the water outlet holes respectively; the fourth water inlet is arranged between the second water inlet cavity and the fourth water outlet cavity; the second water inlet cavity is communicated with the fourth water inlet cavity; the position where the fourth water inlet cavity is communicated with the fourth water outlet cavity is provided with the control assembly, the fourth water inlet cavity can be communicated with or blocked from the fourth water outlet cavity by the control assembly based on the inductive signal from the first inductor; the position where the second water inlet cavity is communicated with the second water outlet cavity is further provided with the second switching core. The structure at the fourth water outlet cavity and the second water outlet cavity is identical to the structure at the third water outlet cavity and the first water outlet cavity; the water outlet end of one of the third water outlet cavity and the first water outlet cavity is used as the water inlet of the second water inlet cavity, therefore, another structure in which the three waterways can be switched by the two electromagnets is obtained. Similarly, the same water outlet cavity and the corresponding structure can also be further increased based on the needs, so that the structure in which more waterways can be switched is obtained.

In the above inductive showerhead, the first inductor comprises an infrared sensor, an acoustic control sensor or a photoelectric sensor. The type of the first inductor can be selected and replaced according to the actual operating environment or the requirements of the user. The infrared sensor and the photoelectric sensor all can comprise emitters and receivers; the emitter emits infrared to the position close to the area where the user is located, and when the emitting route of the emitter is blocked by the user and the light beam emitted by the emitter is reflected back to the receiver, then it means the triggering signal is received. Here, the emitting route of the emitter can slightly deviate from the user's shower area, and the user can block the emitting route by swing the arms; if the acoustic control sensor is selected, then a triggering decibel value can be set, so that the corresponding waterway-switching action can be triggered when the voice made by the user reaches the set decibel value.

In the above inductive showerhead, the power supply unit comprises a hydroelectric generator and/or a storage battery. Due to the structure of the switching core in which the pressure control cavities, the sealing gaskets, the control assemblies and the like are adopted and the action is controlled through the water pressure and the elastic parts, the power requirement of the driving parts are greatly lowered; the hydroelectric generator can be directly arranged in the showerhead, and the driving parts can be powered by the electricity generated through the water flow in the showerhead, so that the self-sufficiency is achieved.

A multi-waterway switching mechanism, comprising the outer shell which is provided with the water inlet and multiple groups of the water outlet holes; the inside of the outer shell is provided with the first water inlet cavity, the third water outlet cavity and the first water outlet cavity, wherein the first water inlet cavity is communicated with the water inlet, and the third water outlet cavity and the first water outlet cavity which are independent of each other; the third water outlet cavity and the first water outlet cavity can be communicated with the corresponding groups of the water outlet holes respectively. The multi-waterway switching mechanism is characterized in that the first water inlet cavity is communicated with the third water outlet cavity through the third water inlet cavity; the position where the third water inlet cavity is communicated with the third water outlet cavity is provided with a control assembly by which the third water inlet cavity can be communicated with or blocked from the third water outlet cavity; the first water inlet cavity, the third water inlet cavity and the first water outlet cavity are communicated with one another; the first switching core is further arranged in the outer shell; the tabular first stress plate and the first sealing part are arranged on the first switching core, wherein the first stress plate is placed at the position where the first water inlet cavity is communicated with the third water inlet cavity, and the first sealing part is placed at the position where the first water inlet cavity is communicated with the first water outlet cavity; when the first water inlet cavity is communicated with the third water outlet cavity and water flows out, the first switching core drives the first sealing part to block the first water inlet cavity and the first water outlet cavity due to water pressure inside the first water inlet cavity; when the first water inlet cavity is blocked from the third water outlet cavity, the first switching core drives the first sealing part to move due to water pressure inside the first water inlet cavity so that the first water inlet cavity can be communicated with the first water outlet cavity.

When the multi-waterway switching mechanism is being used, the water inlet and the water outlet holes in the first body are communicated with the water inlet and the corresponding water outlet holes on the outer shell of the showerhead respectively. When water needs to be discharged from the third water outlet cavity, the control assembly is controlled to act by powering on and off, so that the third water outlet cavity is communicated with the third water inlet cavity; water flows from the first water inlet cavity to the third water outlet cavity through the third water inlet cavity, and is discharged from the water outlet holes communicated with the third water outlet cavity, so the water-discharging function at the third water outlet cavity is achieved. At this moment, water in the first water inlet cavity is discharged in the direction of the third water outlet cavity, and then the differential water pressure is formed between the first water inlet cavity and the third water inlet cavity; the first stress plate of the first switching core drives the first sealing part to block the first water inlet cavity and the first water outlet cavity under the effect of the water pressure, and water does not flow out of the first water outlet cavity. Conversely, when water needs to be discharged from the first water outlet cavity, the control assembly acts to block the third water inlet cavity from the third water outlet cavity, and water does not flow out of the third water outlet cavity; at this moment, the water pressure inside the first water inlet cavity is high, and the first switching core drives the first sealing part to act due to the water pressure in the first water inlet cavity, so that the first water inlet cavity is communicated with the first water outlet cavity; water flows into the first water inlet cavity and is discharged through the first water outlet cavity, so another water-discharging function is achieved. According to the multi-waterway switching mechanism, by adopting the structure in which one control assembly is coupled with the first switching core, water can be discharged by switching of two waterways under the control of one control assembly, the energy consumption is lowered, the structural parts are reduced, and the structure is simplified. Meanwhile, the third water outlet cavity and the first water outlet cavity are independent of each other, so the circumstance where the two cavities are communicated with each other is prevented; the requirement for processing precision which affects the sealing performance is lowered, the reliability is good, and the production cost is further lowered.

In this multi-waterway switching mechanism, the structure of the first switching core and the structure of the control assembly in the multi-waterway switching mechanism are identical to the structure of the first switching core and the structure of the control assembly in the inductive showerhead.

An inductive showerhead, comprising the outer shell which is provided with the water inlet at the upper side. multiple groups of the water outlet holes are formed in the bottom of the outer shell, and mutually independent water outlet cavities are arranged in the outer shell, wherein the number of the water outlet cavities is the same as the number of groups of the water outlet holes, and the multiple water outlet cavities are communicated with the multiple groups of the water outlet holes in a one-to-one corresponding mode. The inductive showerhead is characterized in that the control assembly, the sixth driving part, the second inductor and the power supply unit are further fixedly arranged in the outer shell, wherein the control assembly is provided with the water inlet end and multiple water outlet ends, the sixth driving part is capable of driving the control assembly to act, and the power supply unit is capable of supplying power to the sixth driving part; the water inlet end of the control assembly is communicated with the water inlet of the outer shell; the number of the water outlet ends is equivalent to the number of the water outlet cavities, and the water outlet ends are communicated with the water outlet cavities in an one-to-one corresponding mode; based on the inductive signal from the second inductor, the sixth driving part can drive the control assembly to switch and select to open one or multiple water outlet ends; the control assembly comprises the pressure control cavities, the springs and movable sealing gaskets, wherein the sealing gaskets can isolate the pressure control cavities from the water outlet cavities, and also isolate the pressure control cavities from the water inlet ends of the control assembly; the sealing gaskets can be abutted against the openings of the water inlet ends of the water outlet cavities in a sealed mode under the effects of the elasticity of the springs and the water pressure in the pressure control cavities; the pressure control cavities are communicated with the water inlet ends of the control assembly through the water inlet holes; the pressure control cavities are further communicated with the water outlet cavities through the pressure-relieving channels; the cross-sectional area of each water inlet hole is less than that of each pressure-relieving channel, and the cross-sectional area of the opening at the water inlet end on each water outlet cavity is greater than them both; the sixth driving part is capable of blocking or communicating the pressure-relieving channels.

The showerhead receives the user's triggering signals through the second inductor, and based on different triggering signals, the sixth driving part is capable of driving the control assembly to switch and select to open different water outlet ends, therefore, water can be discharged from different groups of the water outlet holes. In this working process, due to the fact that the sixth driving part responsible for switching the waterways is used in combination with the control assembly, so that requirements for the driving force and the driving power of the sixth driving part are greatly lowered when switching the waterways; the power supply unit can just supply a low current to the sixth driving part to achieve the stable driving without needing to add an external high power supply, so the external energy consumption is lowered, the usage cost is lowered, and the utilization reliability is high. Here, the structure and principle of the control assembly can be referred to the present control assembly in a pilot-operated solenoid valve and other valve structures, or to be exact, the structures in which the large volume is controlled by the small volume. By using the working principle of the control assembly, the sixth driving part only needs to control the small volume in order to change the large volume, so the requirements for the driving force and the driving power of the sixth driving part are greatly lowered.

Compared with the prior art, the inductive showerhead adopts the combination of the control assembly with one switching core in order to achieve the switching of two waterways under the control of one electromagnet, so the energy consumption for controlling the waterway-switching is lowered; the electromagnet is powered by the hydroelectric power generated by the hydroelectric generator arranged in the showerhead, therefore, the self-sufficiency is achieved, the structure is greatly simplified, the requirement for processing precision of all parts in the showerhead is lowered, the cost is lowered, and meanwhile the reliability when using the product is improved.

DETAILED DESCRIPTION OF THE INVENTION

Preferred embodiments of the invention will be described below and the technical solutions of the invention will be further illustrated in connection with the accompanying figures. However, the present invention shall not be limited to these embodiments.

First Embodiment

Figure 1:
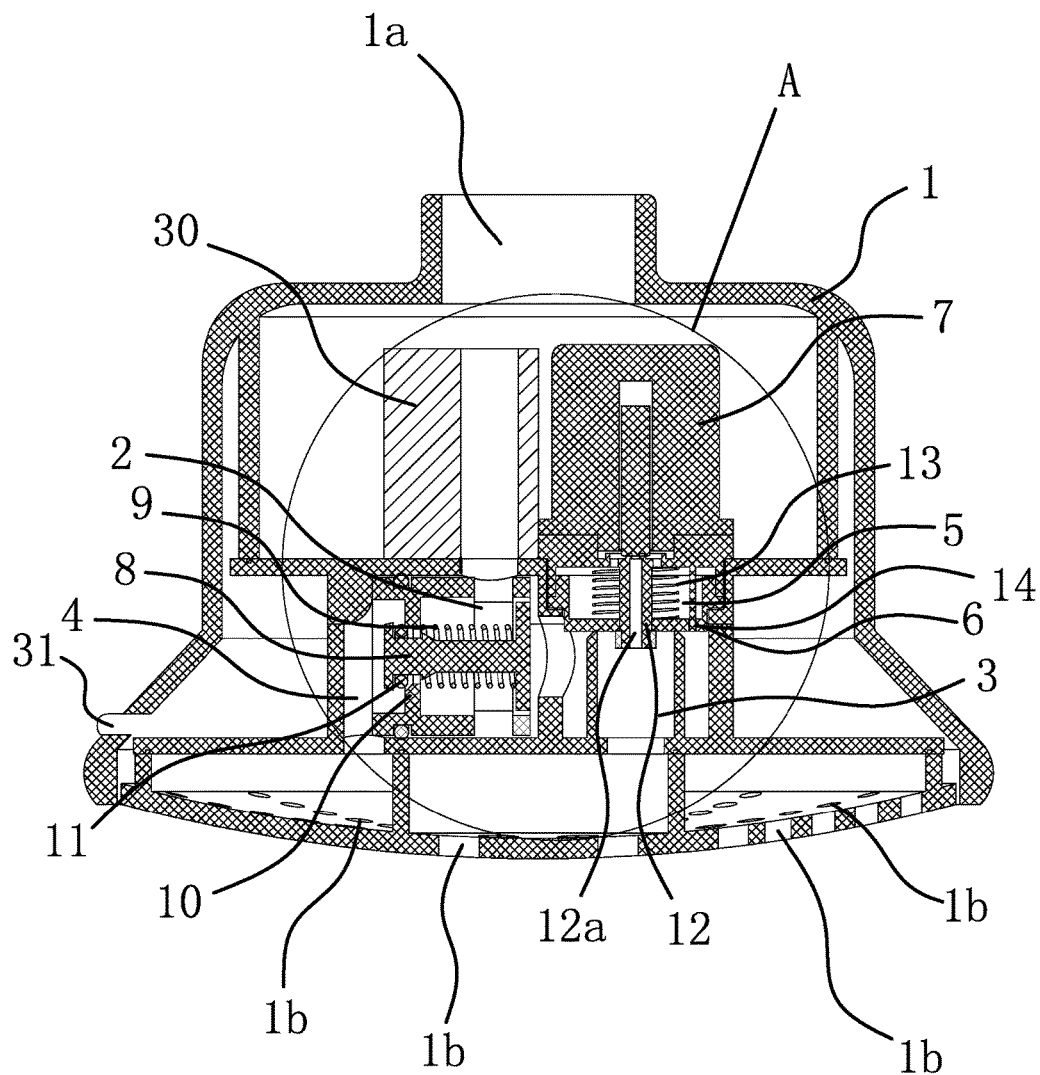
FIG. 1 shows a sectional view of the inductive showerhead in a first preferred embodiment.

As shown in FIG. 1, a first preferred embodiment of the inductive showerhead comprises the outer shell (1) provided with the water inlet (1a) and multiple groups of the water outlet holes (1b); each group of the water outlet holes (1b) is positioned differently so that water can be sprayed in a flower pattern; the outer shell (1) is provided with the first water inlet cavity (2), the third water outlet cavity (3) and the first water outlet cavity (4), wherein the first water inlet cavity (2) is communicated with the water inlet (1a), and the third water outlet cavity (3) and the first water outlet cavity (4) are independent of each other; the third water outlet cavity (3) and the first water outlet cavity (4) are communicated with the corresponding groups of the water outlet holes (1b) respectively. In addition, the inductive showerhead further comprises the control assembly provided with the third driving part (7), the first inductor (31) and the power supply unit (30) used for supplying power to the third driving part (7); the third water inlet cavity (32) is arranged between the first water inlet cavity (2) and the third water outlet cavity (3); the first water inlet cavity (2) is communicated with the third water inlet cavity (32); the control assembly is arranged at the position where the third water inlet cavity (32) is communicated with the third water outlet cavity (3); the third driving part (7) can act, based on the inductive signal from the first inductor (31), to drive the control assembly to communicate or block the third water inlet cavity (32) and the third water outlet cavity (3). In this embodiment, the first inductor (31) is an infrared sensor, and is connected to a control chip; the control chip receives the inductive signal from the first inductor (31) and then sends the control signal to the third driving part (7); the power supply unit (30) is the hydroelectric generator which is correspondingly arranged in the outer shell (1); the third driving part (7) is an electromagnet; of course, based on the needs, an acoustic control sensor or an photoelectric sensor can be selected for the first inductor (31), the storage battery can be selected for the power supply unit (30), and structures that achieve mechanical actions by powering on and off such as a piezoelectric element can be selected for the third driving part (7).

Figure 2:
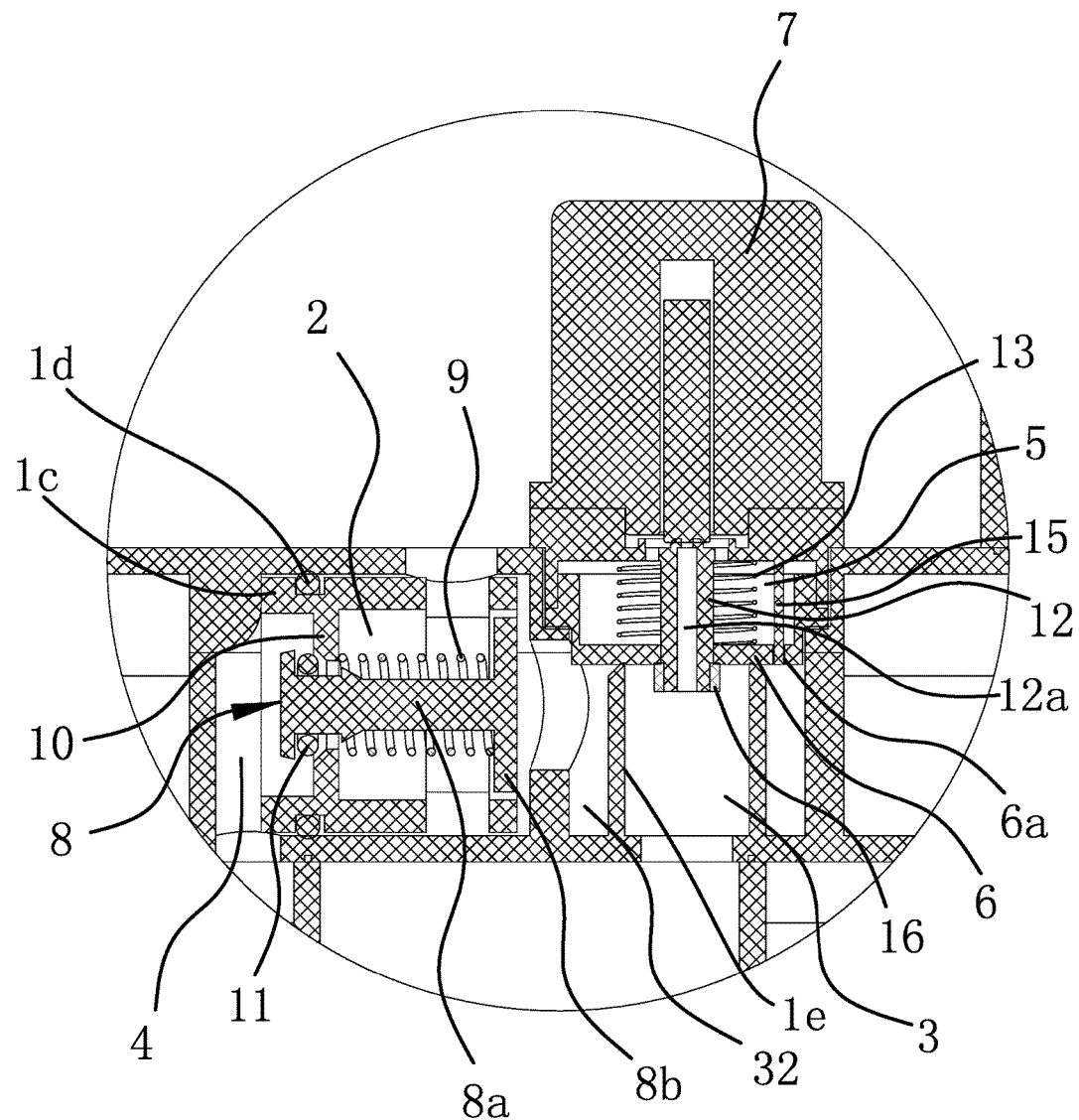
FIG. 2 shows an enlarged view of Section A of FIG. 1.

Particularly, as shown in FIG. 2, the control assembly further comprises the third pressure control cavity (5), the third sealing gasket (6) and the third elastic part (13); the third sealing gasket (6) is made of rubber materials, and is movably arranged between the third pressure control cavity (5) and the third water outlet cavity (3); the third sealing gasket (6) separates the third pressure control cavity (5) from the third water outlet cavity (3) as well as separates the third pressure control cavity (5) from the third water inlet cavity (32). The third driving part (7) is arranged at the other side, opposite to the third sealing gasket (6), of the third pressure control cavity (5); the third elastic part (13) is a spring, and is arranged in the third pressure control cavity (5) which is placed between the third driving part (7) and the third sealing gasket (6); the third sealing gasket (6) is abutted against the opening at the water inlet end of the third water outlet cavity (3) under the elastic force of the spring.

The barrel-shaped third pressure-relieving part (12) which is connected to the outer shell (1) as a whole is further arranged in the third pressure control cavity (5); one end of the third pressure-relieving part (12) penetrates through the middle of the third sealing gasket (6), and is positioned in the third water outlet cavity (3); this end of the third pressure-relieving part (12) is connected with the annular third limiting head (16) which protrudes out of the outer side wall of the third pressure-relieving part (12); the inner side wall of the third sealing gasket (6) is closely abutted against the outer side wall of the third pressure-relieving part (12). The inner side of the third pressure-relieving part (12) is the third pressure-relieving hole (12a) which can communicate the third pressure control cavity (5) with the third water outlet cavity (3); when the armature of the electromagnet used as the third driving part (7) extends out, the opening, positioned in the third pressure control cavity (5), of the third pressure-relieving hole (12a) can be blocked. The outer side of the third pressure-relieving part (12) is sleeved with the third elastic part (13); the two ends of the third elastic part (13) are abutted against the third sealing gasket (6) and the inner side wall of the outer shell (1) respectively.

The third water inlet channel (14) which is capable of communicating the third water inlet cavity (32) with the third pressure control cavity (5) is further formed in the off-center position on the third sealing gasket (6) in a penetrating mode; the largest cross-sectional area of the third water inlet channel (14) is smaller than the smallest of the third pressure-relieving hole (12a). In this embodiment, the third water inlet hole (6a) which is capable of communicating the third water inlet cavity (32) with the third pressure control cavity (5) is formed in the off-center position on the third sealing gasket (6) in a penetrating mode; the outer shell (1) is further provided with the protruding third current-limiting column (15) which is arranged in the third water inlet hole (6a); the third water inlet channel (14) is formed between the outer side wall of the third current-limiting column (15) and the side wall of the third water inlet hole (6a).

The inside of the outer shell (1) is further provided with the valve pocket (1c) which is arranged at the position where the first water inlet cavity (2) is communicated with the first water outlet cavity (4); the outer wall of the valve pocket (1c) is sealed from the outer shell through the third sealing ring (1d); the annular first retaining shoulder (10) which protrudes outward is arranged in the valve pocket (1c); the first switching core (8) and the first elastic part (9) are arranged at the first retaining shoulder (10). Moreover, the first switching core (8) comprises the rod-shaped first connecting part (8a) which is arranged in the first retaining shoulder (10) in a penetrating mode; the inner end of the first connecting part (8a) is positioned in the first water inlet cavity (2), and is further provided with the annular plate-shaped first stress plate (8b) which protrudes out of the outer side wall of the first connecting part (8a); the first elastic part (9) is a spring, and is arranged on the outer side of the first connecting part (8a) in a sleeving mode, wherein the two ends of the first elastic part (9) are abutted against the first stress plate (8b) and the first retaining shoulder (10) respectively. Of course, the first stress plate (8b) can also be in the shape of a disk-shaped plate, and is connected with the end part at the inner end of the first connecting part (8a). The outer end of the first connecting part (8a) is positioned in the first water outlet cavity (4), and an annular groove which revolves around the axis of the first connecting part (8a) is formed in the outer side wall at the outer end of the first connecting part (8a); the annular first sealing part (11) is arranged in the groove, and a part of the first sealing part (11) extends out of the groove; under the effect of the elastic force of the first elastic part (9), the first sealing part (11) can be closely abutted against the first retaining shoulder (10) to achieve the sealing effect. Here, the first sealing part (11) can be of the structures such as an O-shaped ring or an annular gasket.

When the inductive showerhead is being used, water flows into the outer shell (1) and enters the first water inlet cavity (2) through the hydroelectric generator, and the control chip, the first inductor (31) and the third driving part (7) are powered by the electricity generated by the hydroelectric generator. The infrared sensor used as the first inductor (31) can receive the triggering signal in real time, wherein the infrared sensor comprises an infrared emitter and an infrared receiver, the infrared emitter emits infrared to the position close to the area where the user is located, and when the emitting route of the infrared emitter is blocked by the user and the infrared emitted by the infrared emitter is reflected back to the infrared receiver, then it means the triggering signal is received. Here, the emitting route of the infrared emitter can slightly deviate from the user's shower area, and the user can block the emitting route by swing the arms; after the triggering signal is detected by the first inductor (31), the inductive signal is sent to the control chip, and the control chip controls the third driving part (7) to act so as to open one of the third water outlet cavity (3) and the first water outlet cavity (4).

When the outer end of the armature on the electromagnet extends out to block the third pressure-relieving hole (12a), water flows to the first water inlet cavity (2), the third water inlet cavity (32) and the third water inlet channel (14) above the third sealing gasket (6) then into the third pressure control cavity (5), until water pressure is balanced between the third pressure control cavity (5) and the third water inlet cavity (32). At this moment, the third sealing gasket (6) is abutted against the opening at the water inlet end of the third water outlet cavity (3) under the elastic force of the third elastic part (13), so that the third water inlet cavity (32) is blocked from the third water outlet cavity (3). At this moment, the water pressure inside the first water inlet cavity (2) is huge, and pushes the first switching core (8) to overcome the elastic force of the first elastic part (9) to move in the direction of the first water outlet cavity (4), so that the first sealing part (11) is away from the first retaining shoulder (10), and the first water inlet cavity (2) is communicated with the first water outlet cavity (4). When water flows to the first water inlet cavity (2) and the first water outlet cavity (4), then flows out from one or multiple groups of the water outlet hole (1b) which are correspondingly communicated with the first water outlet cavity (4), one water-discharging function is achieved.

When the outer end of the armature on the electromagnet retracts to communicate the third pressure-relieving hole (12a), water inside the third pressure control cavity (5) flows into the third water outlet cavity (3) through the third pressure-relieving hole (12a), and water inside the first water inlet cavity (2) is supplemented to the third pressure control cavity (5) through the third water inlet cavity (32) and the third water inlet channel (14). However, due to the fact that the cross-sectional area of the third pressure-relieving hole (12a) is large and the water-discharging speed is high, the water pressure in the third pressure control cavity (5) decreases constantly. The third sealing gasket (6) is pushed up by the water pressure in the third water inlet cavity (32) and moved away from the opening at the water inlet end of the third water outlet cavity (3). Then water directly flows through the first water inlet cavity (2), the third water inlet cavity (32), the water inlet end of the third water outlet cavity (3), the third water outlet cavity (3) and the one or multiple groups of the water outlet holes (1b) which are correspondingly communicated with the third water outlet cavity (3), therefore, another water-discharging function is achieved. In this process, due to the fact that water in the first water inlet cavity (2) is discharged in the direction of the third water outlet cavity (3), the differential water pressure is formed between the first water inlet cavity (2) and the third water outlet cavity (3); the acting force of the water pressure inside the first water inlet cavity (2) is exerted onto the first stress plate (8b) of the first switching core (8), then the first switching core (8) is reset to its initial state under the effects of the water pressure and the elastic force of the first elastic part (9), and the first sealing part (11) is re-abutted against the first retaining shoulder (10) to achieve the sealing effect so as to block the first water inlet cavity (2) from the first water outlet cavity (4). When the third pressure-relieving hole (12a) is re-blocked by the electromagnet, the working process of the first water-discharging function is repeated.

In combination with the self-generating electric structure in the sixth embodiment which can be adopted to meet the power-supplying requirement of the control assembly.

Second Embodiment

Figure 3:
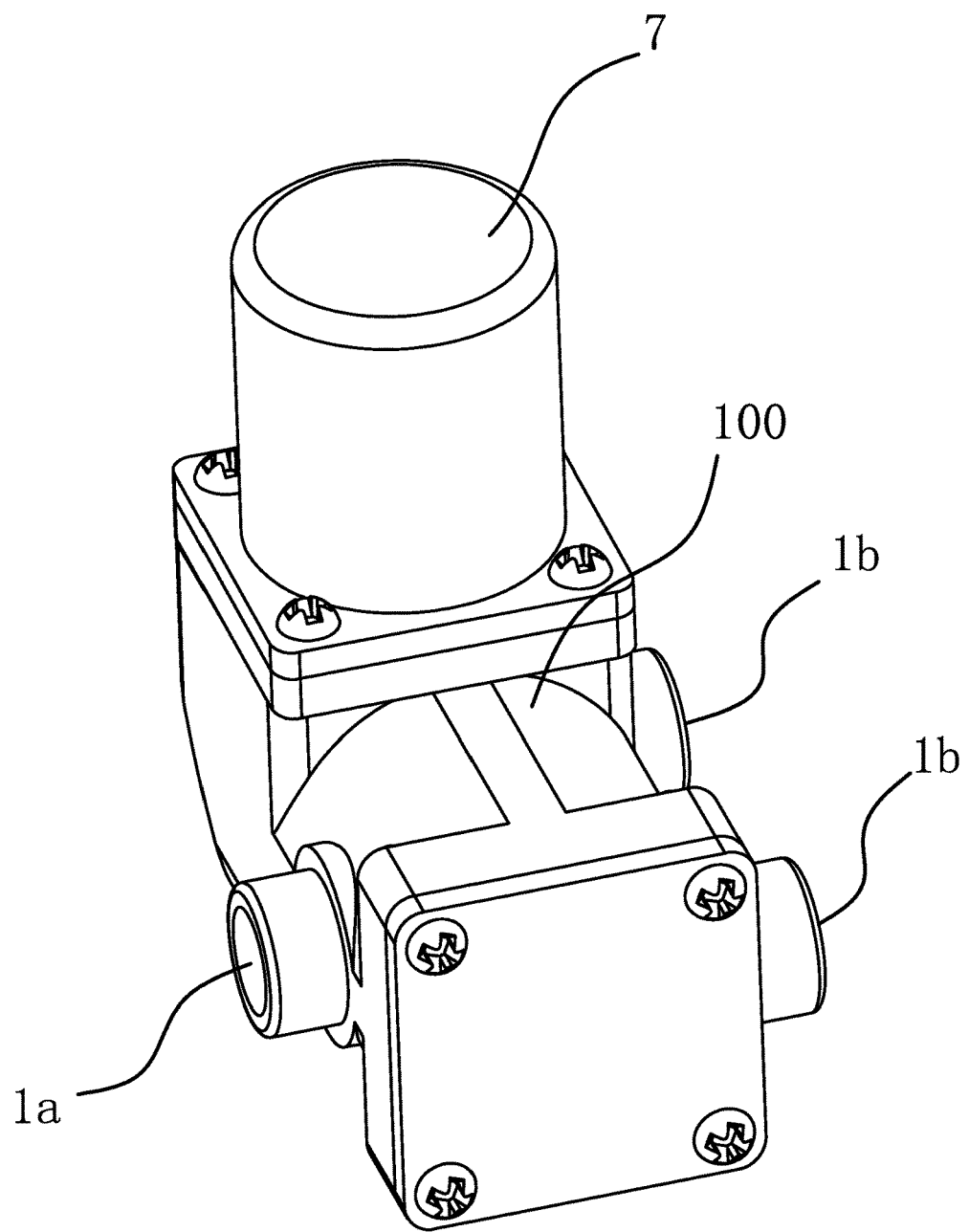
FIG. 3 shows a perspective view of the multi-waterway switching mechanism in a second preferred embodiment.
Figure 4:
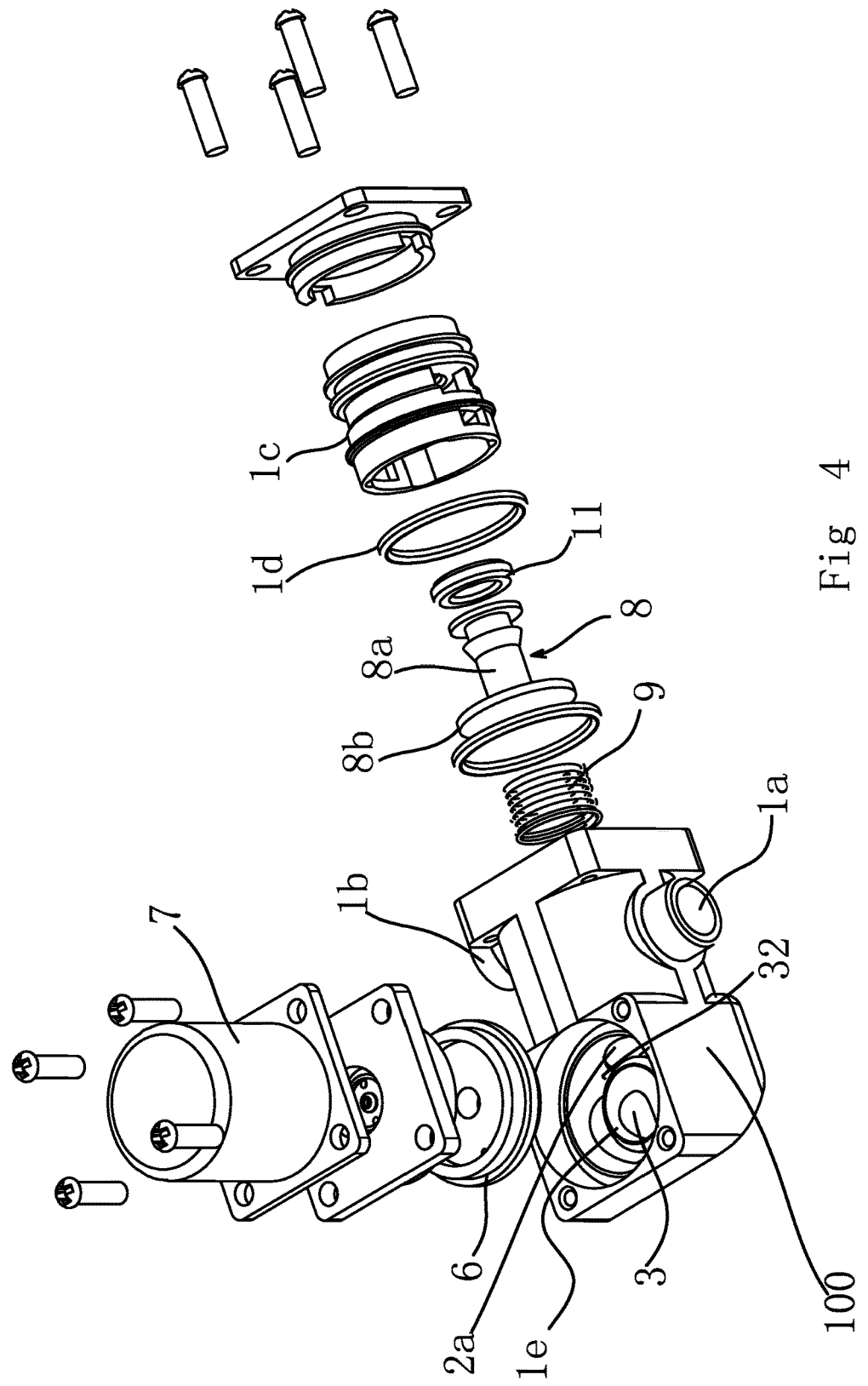
FIG. 4 shows an exploded perspective view of FIG. 3.
Figure 5:
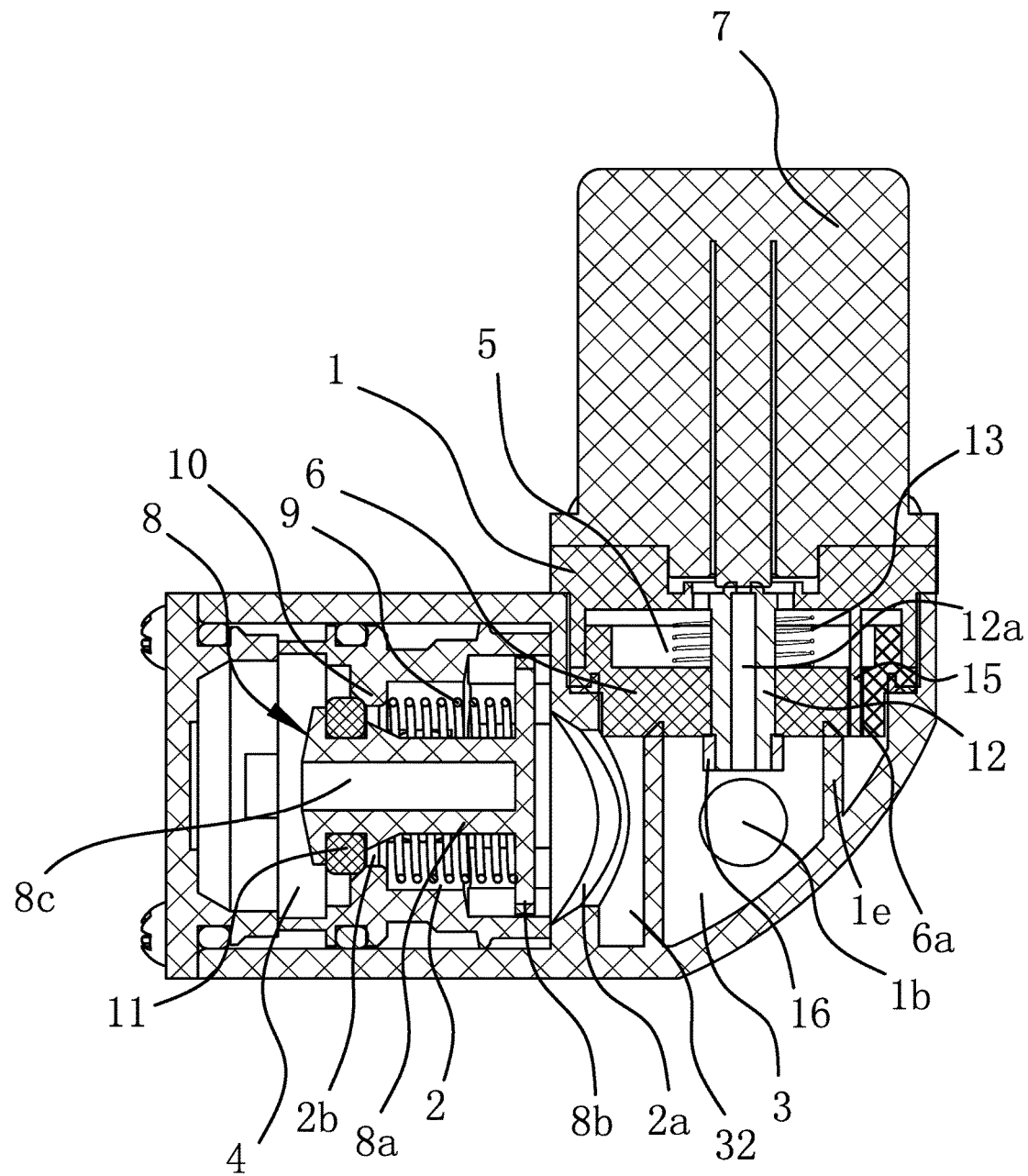
FIG. 5 shows a sectional view of FIG. 3.
Figure 6:
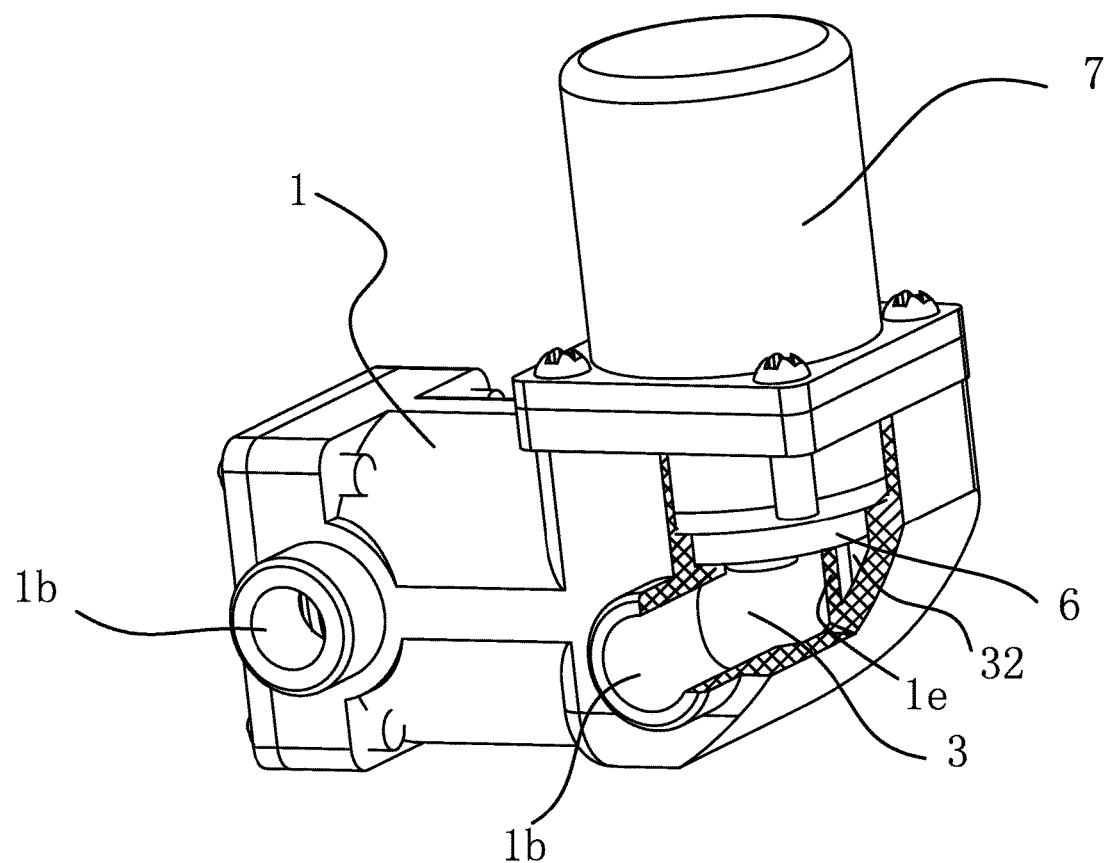
FIG. 6 shows a perspective view of the third water outlet cavity after the partial removal of the outer shell.
Figure 7:
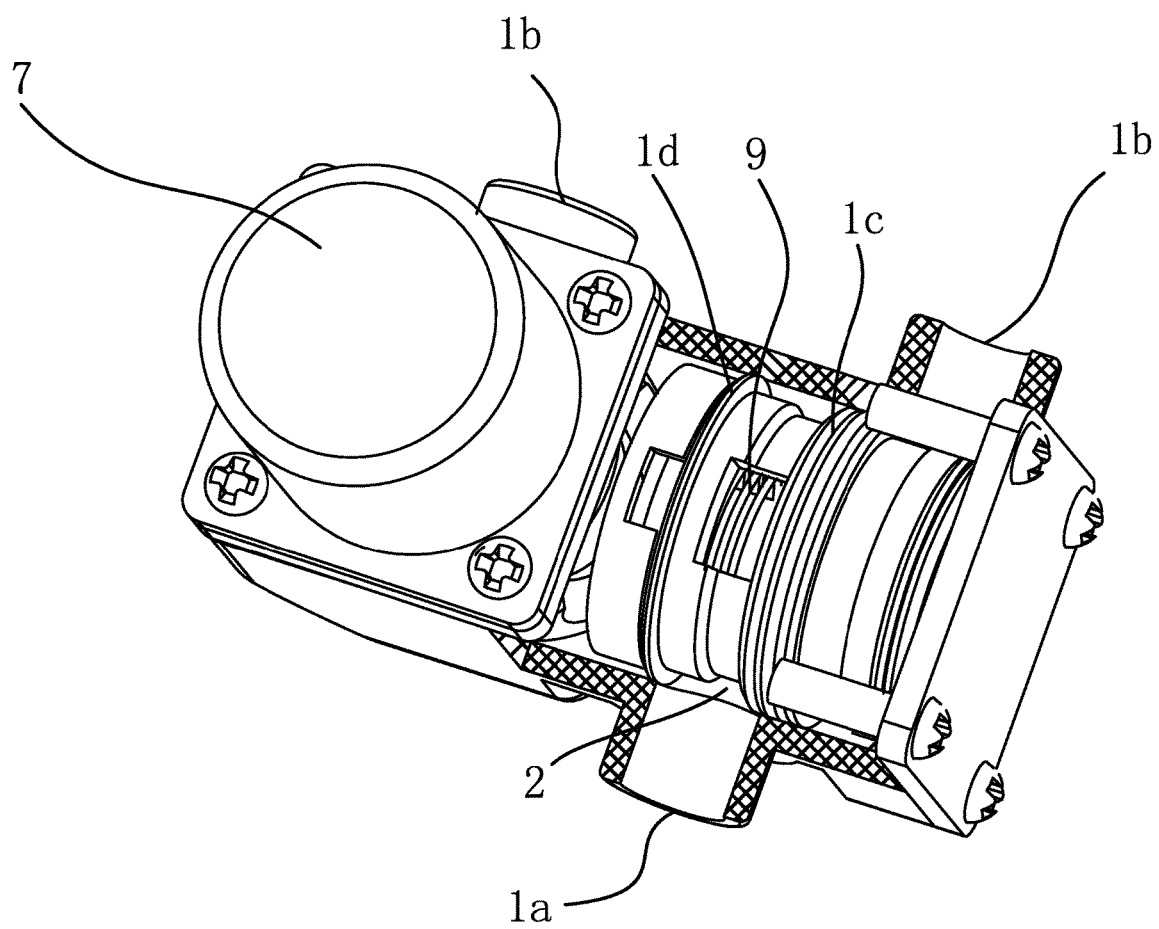
FIG. 7 shows a perspective view of the second water outlet cavity after the partial removal of the outer shell.

As shown in FIG. 3, the second preferred embodiment is a multi-waterway switching mechanism with one inlet and two outlets which can be disassembled and assembled independently, and the multi-waterway switching mechanism can be arranged in the outer shell of the showerhead to directly form the showerhead with two water-discharging patterns in the first embodiment. Details are as follows:

As shown in FIGS. 3 to 7, the multi-waterway switching mechanism comprises a first body (100) provided with the water inlet (1a) and two water outlet holes (1b); the first water inlet cavity (2), the third water outlet cavity (3) and the first water outlet cavity (4) are arranged in the first body (100), wherein the first water inlet cavity (2) is communicated with the water inlet (1a), and the third water outlet cavity (3) and the first water outlet cavity (4) are independent of each other; the first water inlet cavity (2) is positioned between the third water outlet cavity (3) and the first water outlet cavity (4), and the third water outlet cavity (3) and the first water outlet cavity (4) are communicated with the corresponding water outlet holes (1b) respectively. In this embodiment, the first body (100) is a shell which is of the integrated structure or of the structure formed after multiple parts fixedly connected together as a whole.

The third water inlet cavity (32) is arranged in the first body (100) which is positioned between the first water inlet cavity (2) and the third water outlet cavity (3); the third water inlet cavity (32) is formed by the outer wall of the sleeve (1e) arranged in the first body (100) and the interior of the outer shell (1); the first water inlet cavity (2) is communicated with the third water inlet cavity (32) through the first water-passing hole (2a), the position where the third water inlet cavity (32) is communicated with the third water outlet cavity (3) is correspondingly provided with the third pressure control cavity (5), the third driving part (7), the third elastic part (13) and the movable third sealing gasket (6). The third sealing gasket (6) is arranged between the third pressure control cavity (5) and the third water outlet cavity (3), and separates the third pressure control cavity (5) from the third water outlet cavity (3) while separating the first water inlet cavity (2) from the third pressure control cavity (5); the third elastic part (13) is arranged in the third pressure control cavity (5), and the two ends of the third elastic part (13) are abutted against the third sealing gasket (6) and the inner wall of the first body (100) respectively; the third sealing gasket (6) is abutted against the opening at the water inlet end of the third water outlet cavity (3) to achieve the sealing effect under the elastic force of the third elastic part (13).

The third sealing gasket (6) is made of rubber materials; the middle of the third sealing gasket (6) is provided with the barrel-shaped third pressure-relieving part (12) in a penetrated mode, and the inner side wall of the third sealing gasket (6) is closely abutted against the outer side wall of the third pressure-relieving part (12); the inner side of the third pressure-relieving part (12) is the third pressure-relieving hole (12a); the third pressure-relieving part (12) is fixedly connected with the first body (100); one end of the third pressure-relieving part (12) penetrates through the third sealing gasket (6), and is positioned in the third water outlet cavity (3); this end of the third pressure-relieving part (12) is connected with the annular third limiting head (16) which protrudes out of the outer side wall of the third pressure-relieving part (12). In this embodiment, the third elastic part (13) is the spring which is arranged outside of the third pressure-relieving (12) in a sleeving mode; the third driving part (7) is the electromagnet, and the third pressure-relieving hole (12a) can be blocked by the third driving part (7) when being powered on or off; of course, the structures that achieve mechanical actions by powering on and off such as the piezoelectric element can be selected for the third driving part (7).

The third water inlet hole (6a) which is capable of communicating the third water inlet cavity (32) with the third pressure control cavity (5) is further formed in the third sealing gasket (6) in a penetrating mode; the first body (100) is further provided with the protruding column-shaped third current-limiting column (15) which is arranged in the third water inlet hole (6a); the third water inlet channel (14) is formed between the outer side wall of the third current-limiting column (15) and the side wall of the third water inlet hole (6a); the largest cross-sectional area of the third water inlet channel (14) is smaller than the smallest of the third pressure-relieving hole (12a).

The first water inlet cavity (2) is communicated with the first water outlet cavity (4) through the second water passing hole (2b), and the position where the first water inlet cavity (2) is communicated with the first water outlet cavity (4) is further provided with the first switching core (8) and the first elastic part (9); the first switching core (8) can block the first water inlet cavity (2) from the first water outlet cavity (4) under the elastic force of the first elastic part (9); when the first water inlet cavity (2) is blocked from the third water outlet cavity (3), the first switching core (8) can overcome the elastic force of the first elastic part (9) due to the water pressure in the first water inlet cavity (2), and acts so as to communicate the first water inlet cavity (2) with the first water outlet cavity (4).

In this embodiment, the valve pocket (1c) is arranged in the first body (100); the outer wall of the valve pocket (1c) is sealed from the outer shell through the third sealing ring (1d); the position of the valve pocket (1c) where the first water inlet cavity (2) is communicated with the first water outlet cavity (4) is provided with the protruding annular first retaining shoulder (10); the second water-passing hole (2b) is arranged in the first retaining shoulder (10); the first switching core (8) is connected with the first sealing part (11), and due to the elastic force of the first elastic part (9), the first sealing part (11) is abutted against the first retaining shoulder (10) to achieve the sealing effect. Particularly, the first switching core (8) comprises the barrel-shaped first connecting part (8a) which is arranged in the first retaining shoulder (10) in a penetrating mode; the inner end of the first connecting part (8a) is in a closed state and positioned in the first water inlet cavity (2), in addition, the inner end of the first connecting part (8a) is further provided with the annular plate-shaped first stress plate (8b) which protrudes out of the outer side wall of the first connecting part (8a); the two ends of the first elastic part (9) are abutted against the first stress plate (8b) and the first retaining shoulder (10) respectively. The outer end of the first connecting part (8a) is positioned in the first water outlet cavity (4), and the annular groove which revolves around the axis of the first connecting part (8a) is formed in the outer side wall at this end; the first sealing part (11) is in the shape of a ring, and is arranged in the groove. Here, sealing elements such as an O-shaped or ring-shaped sealing gasket can be selected for the first sealing part (11); the spring is adopted on the first elastic part (9), and the outer side of the first connecting part (8a) of the first switching core (8) is sleeved with the spring.

The first body (100) comprises a main body provided with a barrel-shaped installing part, a barrel-shaped installing seat and a gland, wherein the installing seat is coaxially arranged in the installing part, and the sealing element is arranged between the outer side wall of the installing seat and the inner side wall of the installing part; the first retaining shoulder (10) is positioned at the inner side wall of the installing seat; the gland is fixedly connected with the end of the installing part through a fastener in a sealed mode, and one end, facing the installing seat, on the gland can be abutted against the outer end of the installing seat. The first retaining shoulder (10) is positioned in the middle in the installing seat; the space between the first retaining shoulder (10) and the gland is the first water outlet cavity (4), and the other side of the first retaining shoulder (10) is the first water inlet cavity (2); the first switching core (8) is arranged in the installing seat in a penetrating mode.

When the multi-waterway switching mechanism is being used, the water inlet (1a) and the water outlet holes (1b) in the first body (100) are communicated with the water inlet and the corresponding water outlet holes on the outer shell of the showerhead respectively. When water needs to be discharged from the third water outlet cavity (3), the armature in the electromagnet used as the third driving part (7) is controlled to act by powering on and off to move away from the third pressure-relieving hole (12a), and then the third pressure-relieving hole (12a) is opened. Before the third pressure-relieving hole (12a) is opened, the third sealing gasket (6) is abutted against the opening at the water inlet end of the third water outlet cavity (3) under the elastic force of the third elastic part (13), and the water pressure is balanced between the third pressure control cavity (5) and the third water inlet cavity (32). After the third pressure-relieving hole (12a) is opened, water inside the third pressure control cavity (5) flows into the third water outlet cavity (3) through the third pressure-relieving hole (12a); due to the fact that the cross-sectional area of the third pressure-relieving hole (12a) is greater than that of the third water inlet channel (14), the water-discharging speed at the third pressure control cavity (5) is higher than the water-filling speed, and the water pressure in the third pressure control cavity (5) decreases constantly. The acting force of the water pressure in the third water inlet cavity (32) is exerted on the third sealing gasket (6) which separates the third pressure control cavity (5) from the third water inlet cavity (32), so that the third sealing gasket (6) overcomes the elastic force of the third elastic part (13) to move away from the opening at the water inlet end of the third water outlet cavity (3). The third water inlet cavity (32) is communicated with the third water outlet cavity (3); water in the third water inlet cavity (32) directly flows through the third water outlet cavity (3), the water outlet holes (1b) and one or multiple groups of the water outlet holes that are corresponding to the water outlet holes (1b).

When water needs to be discharged from the first water outlet cavity (4), the third driving part (7) is controlled to act again to block the third pressure-relieving hole (12a), and then water in the third pressure control cavity (5) does not flow out; water is filled into the third pressure control cavity (5) through the third water inlet channel (14), and the water pressure in the third pressure control cavity (5) increases gradually; the third sealing gasket (6) is re-abutted against the opening at the water inlet end of the third water outlet cavity (3) to achieve the sealing effect under the elastic force of the third elastic part (13), and water does not flow out of the third water outlet cavity (3). At this moment, water in the first water inlet cavity (2) does not flow out through the third water outlet cavity (3), and the water pressure inside the first water inlet cavity (2) is huge; then the first switching core (8) overcomes the elastic force of the first elastic part (9) due to the effect of the water pressure in the first water inlet cavity (2) to move in the direction of the first water outlet cavity (4); the first sealing part (11) is moved away from the first retaining shoulder (10), so that the first water inlet cavity (2) is communicated with the first water outlet cavity (4); water flows through the first water outlet cavity (4), the water outlet holes (1b) and one or multiple groups of the water outlet holes that are corresponding to the water outlet holes (1b). When the third pressure-relieving hole (12a) is reopened by the third driving part (7), the third water outlet cavity (3) is communicated with the third water inlet cavity (32), and then the differential water pressure is formed between the first water inlet cavity (2) and the third water inlet cavity (32); the effects of the water pressure in the first water inlet cavity (2) and the elastic force of the first elastic part (9) are exerted onto the first stress plate (8b) of the first switching core (8) so as to drive the first switching core (8) to reset; the third water inlet cavity (32) is blocked from the first water outlet cavity (4) again, and water does not flow out of the first water outlet cavity (4).

Third Embodiment

Figure 8:
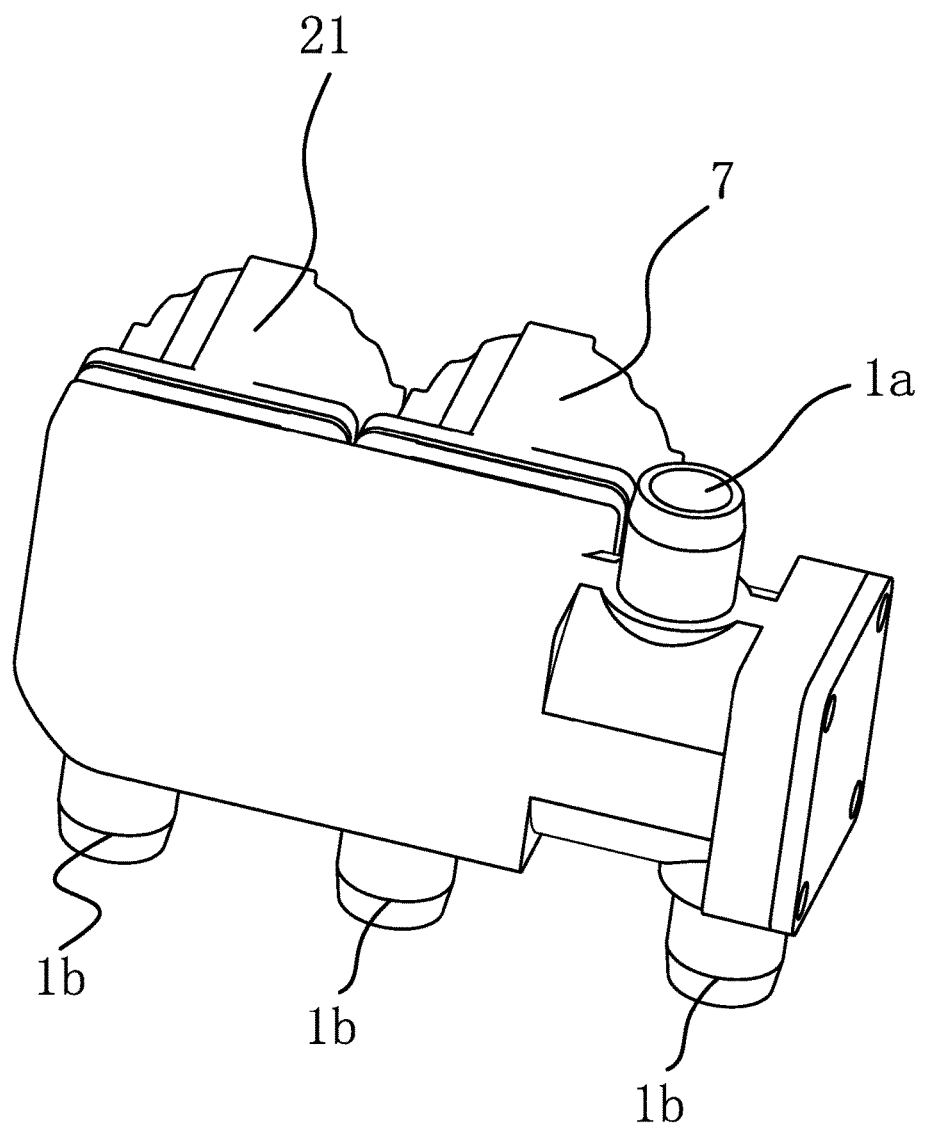
FIG. 8 shows a perspective view of the multi-waterway switching mechanism with one inlet and two outlets in a third preferred embodiment.
Figure 9:
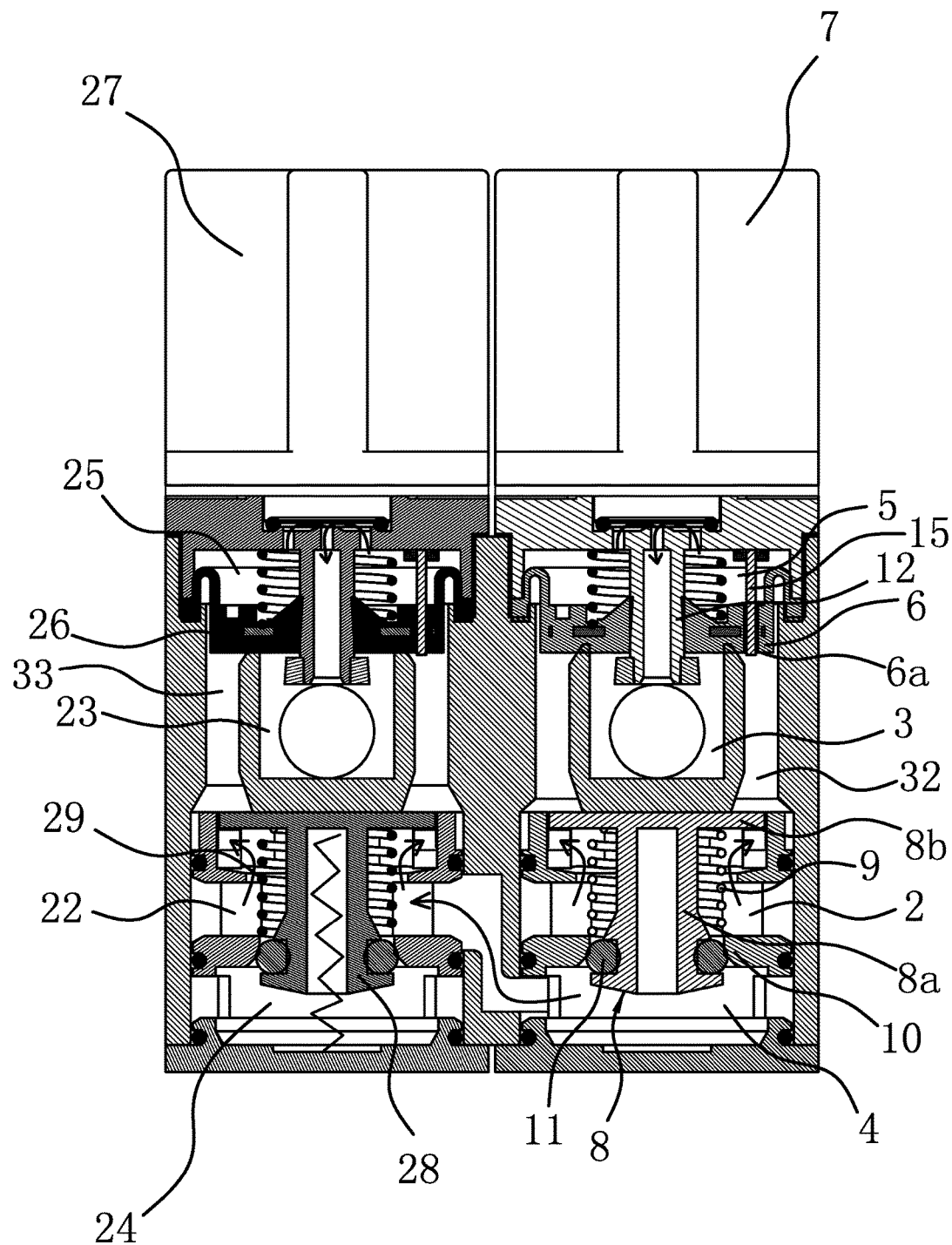
FIG. 9 shows a partial sectional view of FIG. 8 in a third preferred embodiment.

A third preferred embodiment is a multi-waterway switching mechanism with one inlet and three outlets which can be disassembled and assembled independently, and the multi-waterway switching mechanism can be arranged in the outer shell of the showerhead to directly form the showerhead with three water-discharging patterns. The multi-waterway switching mechanism in the third embodiment is similar to the structure in the second embodiment, but the differences are:

As shown in FIGS. 8 and 9, the first switching core (8) comprises the rod-shaped first connecting part (8a) which is arranged in the first retaining shoulder (10) in a penetrating mode; the outer end of the first connecting part (8a) is positioned in the first water outlet cavity (4), and the first sealing part (11) is fixedly connected with the outer side wall at the outer end of the first connecting part (8a); the two ends of the first elastic part (9) are abutted against the outer end of the second connecting end and the side wall of the first water outlet cavity (4) respectively.

The fifth water outlet cavity (17) which is independent of the third water outlet cavity (3) and the first water outlet cavity (4) is further arranged in the first body (100); the fifth water outlet cavity (17) is correspondingly communicated with one or multiple groups of the water outlet holes (1b); the fifth water inlet cavity (34) is arranged between the first water inlet cavity (2) and the fifth water outlet cavity (17), and the first water inlet cavity (2) is communicated with the fifth water inlet cavity (34); the position where the fifth water inlet cavity (34) is communicated with the fifth water outlet cavity (17) is provided with the control assembly; the control assembly comprises the fifth pressure control cavity (18), the fifth elastic part (19) and the fifth sealing gasket (20), wherein the fifth elastic part (19) is positioned in the fifth pressure control cavity (18), and the fifth sealing gasket (20) can be abutted against the opening at the water inlet end of the fifth water outlet cavity (17) under the elastic force of the fifth elastic part (19). The control assembly further comprises the fifth driving part (21); the fifth driving part (21) can act, based on the inductive signal from the first inductor (31), to drive the control assembly to communicate or block the fifth water inlet cavity (34) and the fifth water outlet cavity (17). Here, the control assembly and the working process at the fifth water outlet cavity (17) are the same as the structure of the control assembly and the working process at the third water outlet cavity (3), and fifth water outlet cavity (17) is similarly provided with the barrel-shaped fifth pressure-relieving part, the column-shaped fifth current-limiting column and the ring-shaped fifth limiting head; structures such as the fifth water inlet hole are also formed in the fifth sealing gasket (20); the specific structure and the working process at the fifth water outlet cavity (17) will not be explained in detail.

The differences in the working process compared to the first embodiment are: the third pressure-relieving hole (12a) and the fifth pressure-relieving hole are blocked by the third driving part (7) and the fifth driving part (21) respectively, so that when the openings at the water inlet ends of the third water outlet cavity (3) and the fifth water outlet cavity (17) are blocked by the third sealing gasket (6) and the fifth sealing gasket respectively, the first switching core (8) is then subjected to the effect of the water pressure in the first water inlet cavity (2) to act, and therefore, the first water inlet cavity (2) is communicated with the first water outlet cavity (4). When the corresponding pressure-relieving holes are opened by any of the third driving part (7) and the fifth driving part (21), the first water inlet cavity (2) is blocked from the first water outlet cavity (4) by the first switching core (8).

Fourth Embodiment

Figure 10:
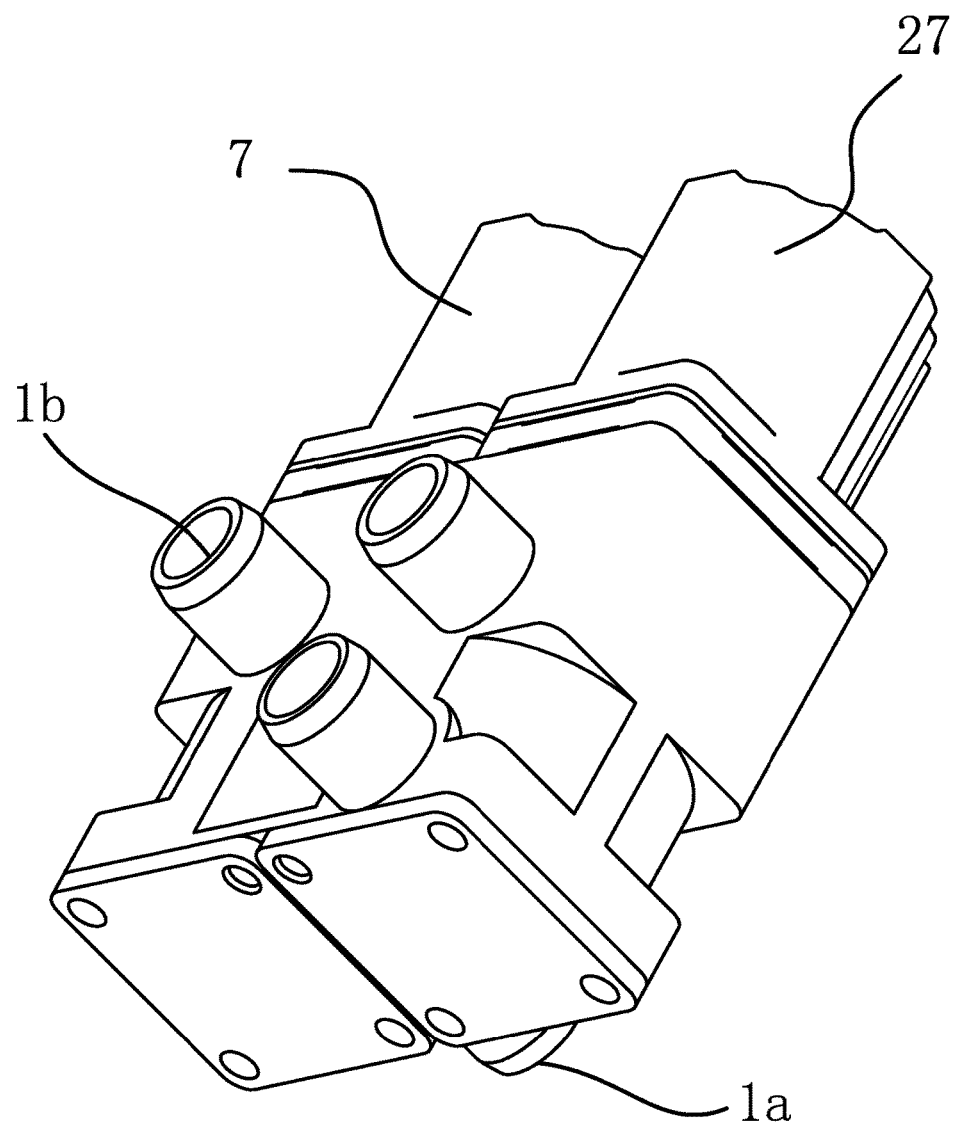
FIG. 10 shows a perspective view of the multi-waterway switching mechanism with one inlet and three outlets in a fourth preferred embodiment.
Figure 11:
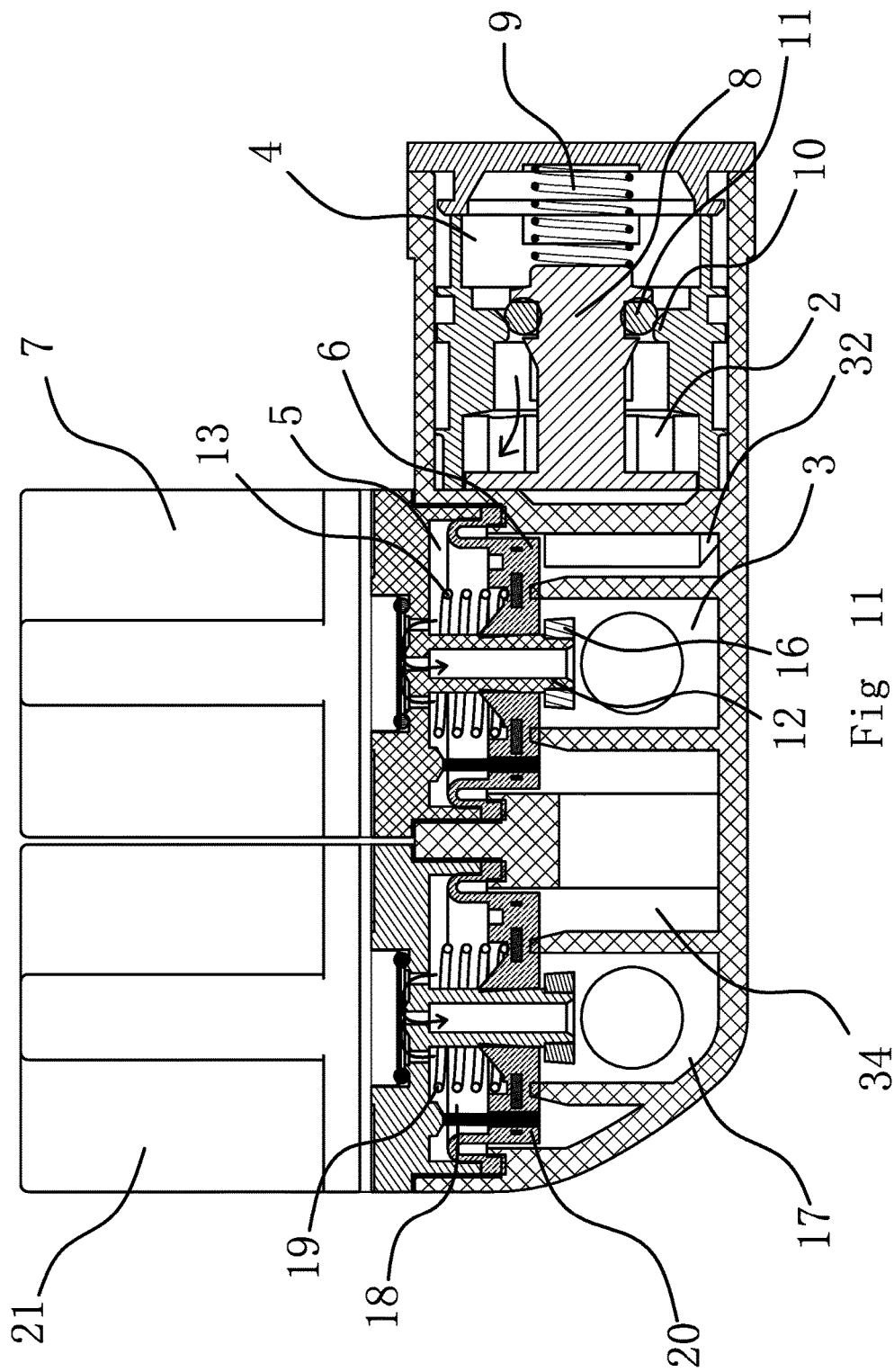
FIG. 11 shows a partial sectional view of FIG. 10 in a fourth preferred embodiment.

A fourth preferred embodiment also is a multi-waterway switching mechanism with one inlet and three outlets which can be disassembled and assembled independently, and the multi-waterway switching mechanism can be arranged in the outer shell of the showerhead to directly form the showerhead with three water-discharging patterns. The multi-waterway switching mechanism in the fourth embodiment is similar to the structure in the second embodiment, but the differences are:

As shown in FIGS. 10 and 11, the first switching core (8) comprises the rod-shaped first connecting part (8a) which is arranged in the first retaining shoulder (10) in a penetrating mode; the outer end of the first connecting part (8a) is positioned in the first water outlet cavity (4), and the first sealing part (11) is fixedly connected with the outer side wall at the outer end of the first connecting part (8a); the concave cavity (8c) is further formed in the end face at the outer end of the first connecting part (8a), which means the first connecting part (8a) is in the shapes of a barrel; the two ends of the first elastic part (9) are abutted against the bottom of the concave cavity (8c) and the side wall of the first water outlet cavity (4) respectively. Here, the outer side of the first connecting part (8a) can be sleeved with the first elastic part (9) the same way as that in the first embodiment based on the needs, and of course, the first elastic part (9) can also be arranged at two positions.

The first body (100) is provided with the third water outlet hole (1b); the second water inlet cavity (22), the fourth water outlet cavity (23) and the second water outlet cavity (24) are further arranged in the first body (100), wherein the fourth water outlet cavity (23) and the second water outlet cavity (24) are independent of each other; the water outlet end of the first water outlet cavity (4) is communicated with the second water inlet cavity (22); the fourth water outlet cavity (23) and the second water outlet cavity (24) can be communicated with the corresponding water outlet holes respectively, which means the water outlet ends of the third water outlet cavity (3), the fourth water outlet cavity (23) and the second water outlet cavity (24) are communicated with three corresponding water outlet holes (1b) respectively, and the water outlet end of the first water outlet cavity (4) is communicated with the second water inlet cavity (22). Of course, if necessary, the used can also consider communicating the water outlet end of the third water outlet cavity (3) with the second water inlet cavity (22), and communicating the water outlet end of the seventh water outlet cavity (7) with the corresponding water outlet hole (1b). The fourth water inlet cavity (33) is arranged between the second water inlet cavity (22) and the fourth water outlet cavity (23); the second water inlet cavity (22) is communicated with the fourth water inlet cavity (33) through the fourth water-passing hole (21a); the fourth pressure control cavity (25), the fourth sealing gasket (26), the fourth elastic part and the fourth driving part (27) are arranged at the position where the fourth water inlet cavity (33) is communicated with the fourth water outlet cavity (23); the fourth driving part (27) can act, based on the inductive signal from the first inductor (31), to drive the control assembly to communicate or block the fourth water inlet cavity (33) and the fourth water outlet cavity (23). The position where the second water inlet cavity (22) is communicated with the second water outlet cavity (24) is further provided with the second switching core (28) and the second elastic part (29). Here, the structures of the fourth water outlet cavity (23) and the second water outlet cavity (24) are the same as the structures of the third water outlet cavity (3) and the first water outlet cavity (4) in a corresponding mode; the water outlet end of one of the third water outlet cavity (3) and the first water outlet cavity (4) is used as the water inlet (1a) of the second water inlet cavity (22), therefore, another structure in which the three water-ways can be switched by the two driving parts is obtained. Similarly, the same water outlet cavity and the corresponding structure can also be further increased based on the needs, so that the structure in which more waterways can be switched is obtained.

In this embodiment, the second water inlet cavity (22) is communicated with the first water outlet cavity (4), then when the third pressure-relieving hole (12a) is blocked by the third driving part (7), the first switching core (8) is opened, and the first water inlet cavity (2) is sequentially communicated with the first water outlet cavity (4) and the second water inlet cavity (22); if the fourth pressure-relieving hole is blocked by the fourth driving part (27), then the second switching core (28) is opened, and water in the second water inlet cavity (22) flows out through the second water outlet cavity (24); if the fourth pressure-relieving hole is communicated by the fourth driving part (27), then the second switching core (28) is blocked, and water in the second water inlet cavity (22) flows out through the fourth water outlet cavity (23); Conversely, when the third pressure-relieving hole (12a) is communicated by the third driving part (7), the first switching core (8) is blocked, and water in the first water inlet cavity (2) flows out through the third water inlet cavity (32) and the third water outlet cavity (3).

In addition, the waterway-switching structure provided with all the water outlet cavities in the inductive showerhead can be arranged together with the first body (100) as a whole as in the first embodiment, and also can be arranged independently with the casing as in the second and third embodiments, and then the casing is fixed inside the first body (100); the waterway-switching structure is applicable to the overhead showerhead, the handheld showerhead, the shower column or the shower panel and other various shower installations. Furthermore, apart from the structures of the first switching core (8), the first switching core (8) can also be of the umbrella-shaped structure, and comprises a straight rod-shaped rod part and a sealing part which is connected to one end of the rod part; the first switching core (8) is arranged in the first water outlet cavity (4), and the sealing part faces the position of the first retaining shoulder (10); the spring is adopted on the first elastic part (9), and the outer side of the rod part is sleeved with the first elastic part (9); the two ends of the spring are abutted against the inner side wall of the first water outlet cavity (4) and the sealing part respectively; the sealing part can be abutted against the first retaining shoulder (10) under the elastic force of the spring to achieve the sealing effect; when the water pressure in the first water inlet cavity (2) is huge, the first switching core (8) can be pushed to overcome the elastic force of the spring so that the first water outlet cavity (4) can be communicated with the first water inlet cavity (2). Similarly, the second switching core (28) adopts the same structure as the first switching core (8).

Fifth Embodiment

Figure 12:
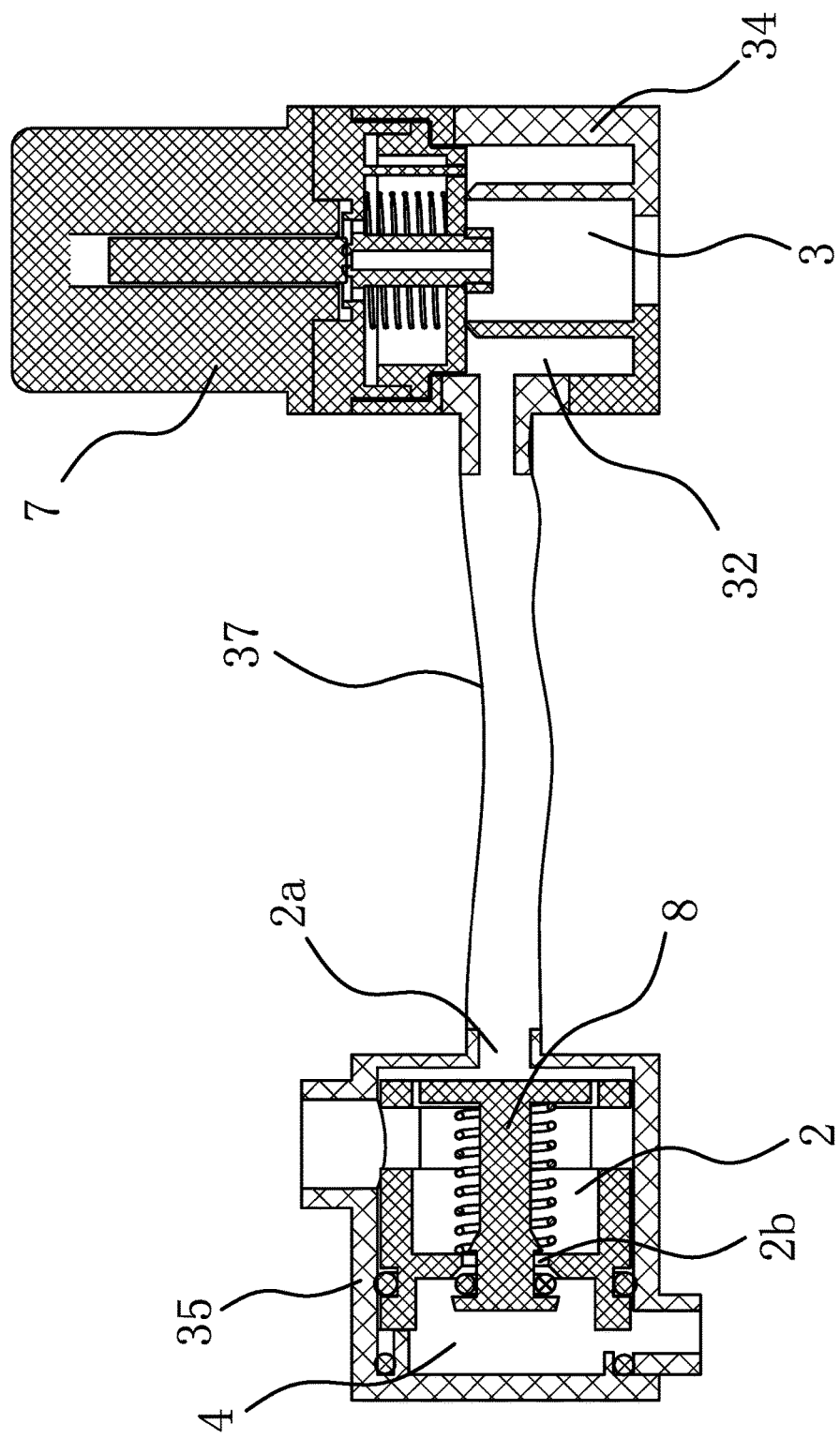
FIG. 12 shows a sectional view of the split-type multi-waterway switching mechanism in a fifth preferred embodiment.

As shown in FIG. 12, the structure and working principle of a fifth preferred embodiment are essentially the same as those in the second embodiment, but the differences are: the first body (100) comprises the first shell (35) and the second shell (36) which are independent of each other; the third water outlet cavity (3), the third water inlet cavity (32) and the control assembly are all arranged in the first shell (35); the first water outlet cavity (4), the first water inlet cavity (2) and the first switching core (8) are all arranged in the second shell (36); the first water-passing hole (2a) is communicated with the third water inlet cavity (32) through the water-passing pipe (37).

In addition, the multi-waterway switching mechanism can be connected to the outer shell of the shower installation using the waterway switching mechanism to be arranged as a whole, which means all cavities can be directly formed in the outer shell and all parts can be directly arranged in the outer shell, meanwhile, the first body (100) can also be independently arranged then fixed inside the outer shell; the multi-waterway switching mechanism is applicable to the overhead showerhead, the handheld showerhead, the shower column or the shower panel and other various shower installations. Furthermore, apart from the structures of the first switching core (8), the first switching core (8) can also be of the umbrella-shaped structure, and comprises a straight rod-shaped rod part and a sealing part which is connected to one end of the rod part; the first switching core (8) is arranged in the first water outlet cavity (4), and the sealing part faces the position of the first retaining shoulder (10); the spring is adopted on the first elastic part (9), and the outer side of the rod part is sleeved with the first elastic part (9); the two ends of the spring are abutted against the inner side wall of the first water outlet cavity (4) and the sealing part respectively; the sealing part can be abutted against the first retaining shoulder (10) under the elastic force of the spring to achieve the sealing effect; when the water pressure in the first water inlet cavity (2) is huge, the first switching core (8) can be pushed to overcome the elastic force of the spring so that the first water outlet cavity (4) can be communicated with the first water inlet cavity (2). Similarly, the second switching core (28) adopts the same structure as the first switching core (8). The structures of all switching cores can be combined with the structure of the main body provided with the multiple water outlet cavities at will; the main body structure in the second and third embodiments can be the same as that in the fourth embodiment, wherein the outer shell where the first water inlet cavity, the second water inlet cavity and all of the water outlet cavities are positioned are segmented into multiple independent outer shells, and then those outer shells are correspondingly communicated through the water-passing pipe (37) so that the installation is convenient.

The multi-waterway switching mechanism can be connected to the outer shell of the shower installation using the multi-waterway switching mechanism to be arranged as a whole, which means all cavities can be directly formed in the outer shell and all parts can be directly arranged in the outer shell, meanwhile, the first body (100) can also be independently arranged then fixed inside the outer shell; the multi-waterway switching mechanism is applicable to the overhead showerhead, the handheld showerhead, the shower column or the shower panel and other various shower installations.

Sixth Embodiment

Figure 13:
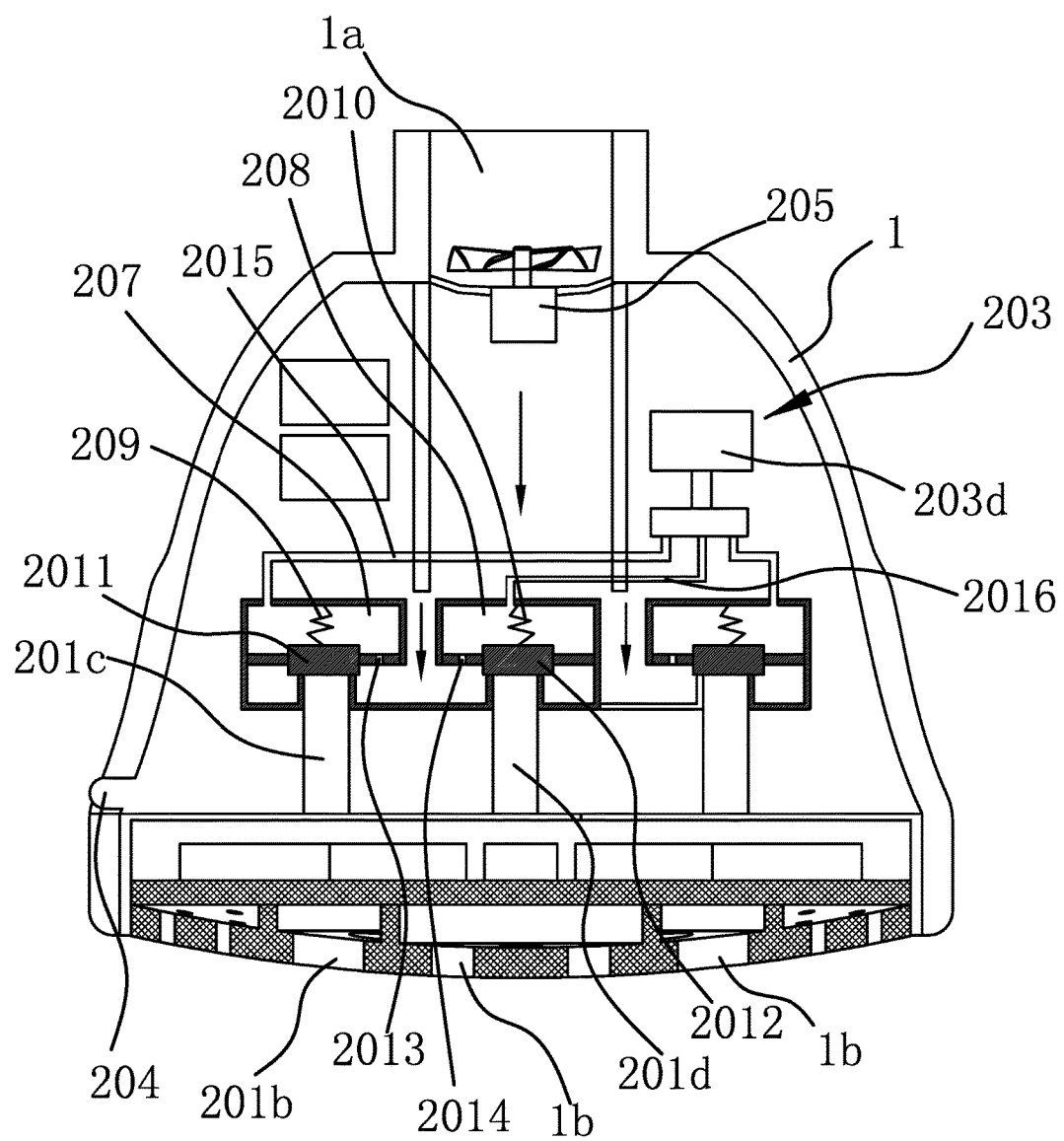
FIG. 13 shows a sectional view of the showerhead in a sixth preferred embodiment.

In a sixth preferred embodiment, the control assembly comprises the pressure control cavities, the springs and movable sealing gaskets, wherein the sealing gaskets can isolate the pressure control cavities from the water outlet cavities as well as isolate the pressure control cavities from the water inlet ends of the control assembly; the sealing gaskets are abutted against the openings at the water inlet ends of the water outlet cavities in a sealed mode under the effects of the elastic force of the springs and the water pressure in the pressure control cavities. As shown in FIG. 13, the showerhead adopts the control assembly to form the multi-waterway switching mechanism, and comprises the outer shell (1) provided with the water inlet (1a) at the top; multiple groups of the water outlet holes (1b) are formed in the bottom of the outer shell (1), and mutually independent water outlet cavities are arranged in the outer shell (1), wherein the number of the water outlet cavities is the same as the number of groups of the water outlet holes (1b), and the multiple water outlet cavities are communicated with the multiple groups of the water outlet holes (1b) in a one-to-one corresponding mode. The control assembly, the sixth driving part (203), the second inductor (204) and the power supply unit (30) are further fixed in the outer shell (1), wherein the control assembly is provided with the water inlet end and multiple water outlet ends, the sixth driving part (203) is capable of driving the control assembly to act, and the power supply unit (30) is capable of supplying power to the sixth driving part (203); the water inlet end of the control assembly is communicated with the water inlet (1a) of the outer shell (1); the number of the water outlet ends is the same as the number of the water outlet cavities, and the water outlet ends are communicated with the water outlet cavities in a one-to-one corresponding mode; based on the inductive signal from the second inductor (204), the sixth driving part (203) can drive the control assembly to switch and select to open one or multiple water outlet ends.

Particularly, the pressure control cavities are communicated with the water inlet ends of the control assembly through the water inlet holes, and the pressure control cavities are communicated with the water outlet cavities through the pressure-relieving channels. the cross-sectional area of each water inlet hole is less than that of each pressure-relieving channel, and the cross-sectional area of the opening at the water inlet end of each water outlet cavity is greater than them both; the pressure-relieving channels can be blocked or communicated by the sixth driving part (203). The numbers of the pressure control cavities, the springs, the sealing gaskets and the water outlet cavities which are arranged in a one-to-one corresponding are all three, and the connection relations and working principles of the three groups of structures are the same, therefore, the followings are two groups of the structures which are taken as examples to explain the structures and the working processes. Of course, based on the circumstances, the number of groups of the corresponding structures can be increased up to four, five, six or more.

The control assembly further comprises the casing (206); the pressure control cavities include the concave first pressure control cavity (207) and the concave second pressure control cavity (208) which are positioned in the casing (206); the spring include the first spring (209) and the second spring (2010) which are arranged in the first pressure control cavity (207) and the second pressure control cavity (208) respectively; the water outlet cavities include the sixth water outlet cavity (201c) and the seventh water outlet cavity (201d), the sealing gaskets include the first sealing gasket (2011) and the second sealing gasket (2012), wherein the first sealing gasket (2011) is connected with the opening of the first pressure control cavity (207) in a sealed mode and can be abutted against the opening at the water inlet end of the sixth water outlet cavity (201c), and the second sealing gasket (2012) is connected with the opening of the second pressure control cavity (208) in a sealed mode and can be abutted against the opening at the water inlet end of the seventh water outlet cavity (201d). The first pressure control cavity (207) is communicated with the water inlet end of the control assembly through the first water inlet hole (2013) which is formed in the first sealing gasket (2011) in a penetrating mode; the second pressure control cavity (208) is communicated to the water inlet end of the control assembly through the second water inlet hole (2014) which is formed in the second sealing gasket (2012) in a penetrating mode; the pressure-relieving channels include the first pressure-relieving channel (2015) and the second pressure-relieving channel (2016), wherein the first pressure control cavity (207) is communicated with the sixth water outlet cavity (201c) through the first pressure-relieving channel (2015), and the second pressure control cavity (208) is communicated with the seventh water outlet cavity (201d) through the second pressure-relieving channel (2016); the sixth driving part (203) is capable of communicating one of the first pressure-relieving channel (2015) and the second pressure-relieving channel (2016).

Figure 14:
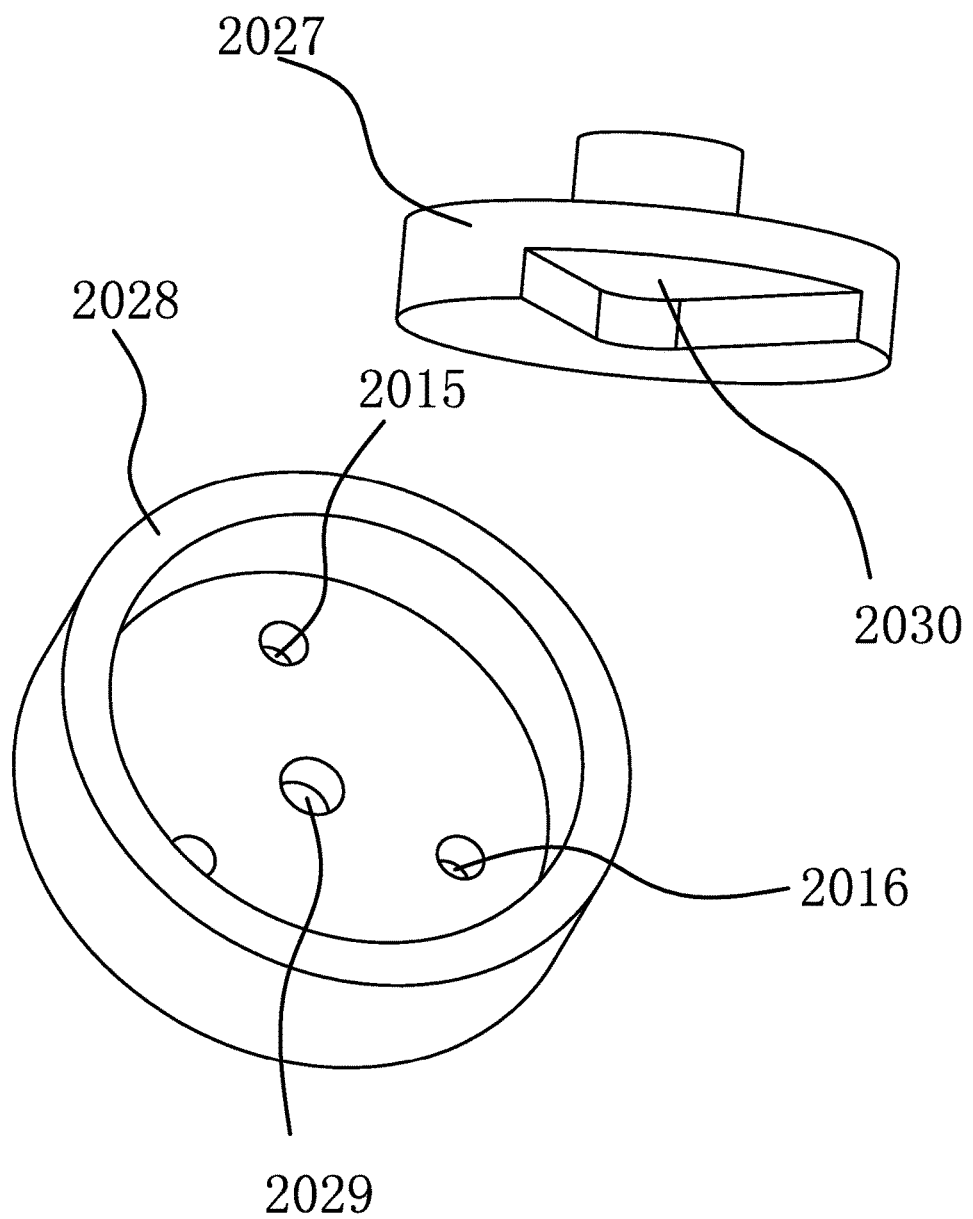
FIG. 14 shows a perspective view of the switching base in a sixth preferred embodiment.

The sixth driving part (203) comprises the driving motor (203d), the disk-shaped rotary disk (2027) and the switching base (2028); as shown in FIG. 14, the top of the switching base (2028) is provided with a concave cylinder-shaped cavity; the rotary disk (2027) is horizontally arranged in the cavity, and the top of the rotary disk (2027) is fixed on the output shaft of the driving motor (203d) in the circumferential direction; the discharging hole (2029) which is communicated with all of the water outlet cavities at the same time is formed in the center at the bottom of the switching base (2028) in a penetrating mode. The bottom of the rotary disk (2027) is provided with the switching concave cavity (2030); the water outlet ends of the first pressure-relieving channel (2015) and the second pressure-relieving channel (2016) are all positioned at the bottom of the switching base (2028), and distributed around the discharging hole (2029); the rotary disk (2027) is driven by the driving motor (203d) to enable the switching concave cavity (2030) position at the bottom of the rotary disk (2027) to communicate the discharging hole (2029) with one of the first pressure-relieving channel (2015) and the second pressure-relieving channel (2016).

In this embodiment, the driving motor (203d) is a speed-reducing motor with gears, and the top of the rotary disk (2027) is provided with a protruding barrel-shaped connecting structure which is used for being fixed on the output shaft of the driving motor (203d) in the circumferential direction; one or multiple of the infrared sensor, the acoustic control sensor and the photoelectric sensor can be adopted by the second inductor (204); the power supply unit (30) comprises the generator (205) capable of hydroelectric generation; of course, based on the needs, the power supply unit (30) can adopts the methods such as the chargeable battery, or a hybrid of the generator (205) with the chargeable battery, or even wireless power transmission to supply power; accordingly, in order to achieve control, the control chip is fixed in the outer shell (1), the second inductor (204), the generator (205) and the sixth driving part (203) are all connected to the control chip, and the control chip is responsible for the receiving, processing, and transmitting of the signals. The cross section of the switching concave cavity (2030) at the bottom of the rotary disk (2027) is in the shape of a fan, and the circle center of the fan is always communicated with the discharging hole (2029).

When the showerhead is in the default state, the driving motor (203d) drives the rotary disk (2027) to rotate until the discharging hole (2029) is communicated with the first pressure-relieving channel (2015), and then the other pressure-relieving channel is blocked; water flows into the casing (206) of the control assembly through the water inlet (1a) of the outer shell (1), then flows into the first pressure control cavity (207) through the first water inlet hole (2013) in the first sealing gasket (2011); meanwhile, water in the first pressure control cavity (207) flows into the switching concave cavity (2030) through the first pressure-relieving channel (2015), and flows out of the discharging hole (2029) into all of the water outlet cavities to be discharged. Due to the fact that the cross-sectional area of the first water inlet hole (2013) is smaller than that of the first pressure-relieving channel (2015), the water-filling speed is lower than the water-discharging speed, and the water pressure in the first pressure control cavity (207) decreases gradually; the first sealing gasket (2011) which is abutted against the opening at the water inlet end of the sixth water outlet cavity (201c) due to the elastic force of the first spring (209) is subjected to the water pressure at the water inlet end of the control assembly to overcome the elastic force of the first spring (209) so as to move away from the opening at the water inlet end of the sixth water outlet cavity (201c); the sixth water outlet cavity (201c) is communicated to the water inlet end of the control assembly, and water is directly discharged through the sixth water outlet cavity (201c) and one group of the water outlet holes (1b) communicated with the sixth water outlet cavity (201c). At this moment, the second pressure-relieving channel (2016) is blocked, and then water in the second pressure control cavity (208) can not flow out; the water pressure in the second pressure control cavity (208) and the water pressure at the water inlet end of the control assembly are gradually balanced; the second sealing gasket (2012) is abutted against the opening at the water inlet end of the seventh water outlet cavity (201d) in a sealed mode under the effects of the water pressure in the second pressure control cavity (208) and the elastic force of the second spring (2010); water does not flow out of the seventh water outlet cavity (201d) and one group of the water outlet holes (201b) corresponding to the seventh water outlet cavity (201d). The state of the third pressure control cavity (5) is the same as that of the second pressure control cavity (208), so no detailed explanation will be made.

If the water-discharging way needs to be switched, the second inductor (204) senses the triggering signal from the user, and sends the signal to the control chip; the control chip controls the driving motor (203d) to be powered on to drive the rotary disk (27) to rotate until the switching concave cavity (2030) communicates the second pressure-relieving channel (2016) with the discharging hole (2029) and blocks the other pressure-relieving channel, and then the driving motor is shut down. At this moment, water in the second pressure control cavity (208) is discharged through the second pressure-relieving channel (2016); the water-discharging speed is higher than the water-filling speed, and then the water pressure in the second pressure control cavity (208) decreases; the second sealing gasket (2012) overcomes the elastic force of the second spring (2010) to be pushed away, and the seventh water outlet cavity (201d) is opened; water directly flows through the seventh water outlet cavity (201d) from the water inlet end of the control assembly, and is discharged from the water outlet holes (1b) corresponding to the seventh water outlet cavity (201d). Meanwhile, due to the fact that the first pressure-relieving channel (2015) is blocked, water entering from the first water inlet hole (2013) is gradually supplemented to the first pressure control cavity (207), and the water pressure increases; the first sealing gasket (2011) moves gradually towards the sixth water outlet cavity (201c) under the effects of the water pressure and the elastic force of the first spring (209) until the sixth water outlet cavity (201c) is blocked; water does not flow out from the water outlet holes (1b) corresponding to the sixth water outlet cavity (201c), and the switching of waterway is completed. The above steps can be repeated, which means it is possible to switch among the multiple waterways in a cyclic mode. In this working process, the generator (205) generates power under the impact of the water flow, although the water flow is unstable, due to the fact that the showerhead adopts the combination of the control assembly with the driving motor (203d), the requirement for the driving force of the driving motor (203d) is greatly lowered when switching the waterway; the power supplied by the generator (205) is completely capable of meeting the driving requirement of the driving motor (203d), therefore, the self-sufficiency is achieved.

Seventh Embodiment

Figure 15:
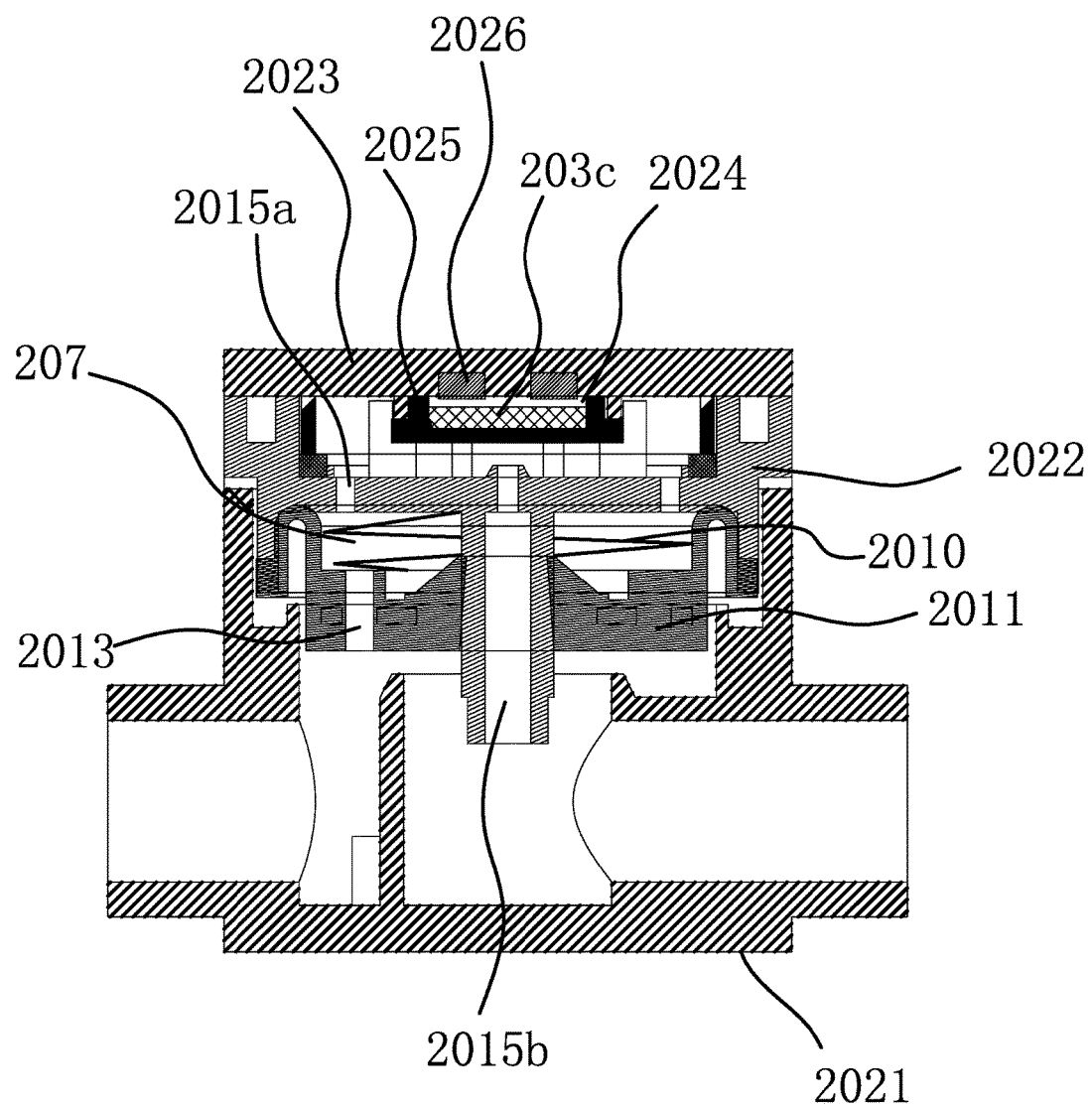
FIG. 15 shows a sectional view of the control assembly of the showerhead in a seventh preferred embodiment.

The structure and working principle in a seventh preferred embodiment are essentially the same as those in the sixth embodiment, but the differences are:

As shown in FIG. 15, the casing (206) of the control assembly comprises the second body (2021), the first middle cover (2022) and the first top cover (2023), wherein the first middle cover (2022) and the first top cover (2023) are arranged at one side of the second body (2021); the second body (2021) is connected with the first middle cover (2022) in a sealed mode, and the first pressure control cavity (207) is formed between the second body (2021) and the first middle cover (2022); the first middle cover (2011) is connected between the first sealing gasket (2022) and the second body (2021); the first spring (209) is arranged in the first pressure control cavity (207). the first top cover (2023) is connected with the first middle cover (2022) in a sealed mode, and the first pressure-relieving cavity is formed between the first top cover (2023) and the first middle cover (2022); the first pressure-relieving channel (2015) comprises the first diversion hole (2015a) and the first pressure-relieving hole (2015b) which are all formed in the first middle cover (2022), wherein the first diversion hole (2015a) is capable of communicating the first pressure control cavity (207) with the first pressure-relieving cavity, the first pressure-relieving hole (2015b) is capable of communicating the first pressure-relieving cavity with the sixth water outlet cavity (201c), and the diameters of the first diversion hole (2015a) and the first pressure-relieving hole (2015b) are all greater than the diameter of the first water inlet hole (2013) which is formed in the first sealing gasket (2011) in a penetrating mode.

In this embodiment, the sixth driving part (203) comprises the first piezoelectric element (203c) which is fixedly connected with the first top cover (2023) and is opposite to one side of the first middle cover (2022), and the first piezoelectric element (203c) directly faces the water inlet end of the first pressure-relieving hole (2015b). Particularly, the first positioning concave cavity (2024) is arranged on the first top cover (2023), and the opening of the first positioning concave cavity (2024) is connected with the deformable sealing piece (2025) in a sealed mode; the first piezoelectric element (203c) is arranged in the first positioning concave cavity (2024), and one side of the first piezoelectric element (203c) is abutted against the sealing piece (2025); the first limiting block (2026) which is used for limiting the deformation direction of the piezoelectric element is further arranged between the other side of the first piezoelectric element (203c) and the first top cover (2023). In this embodiment, the first limiting block (2026) is a rubber block.

The structure at the second pressure control cavity (208) is completely identical to the structure at the first pressure control cavity (207), and particularly comprises the second middle cover and the second top cover which are arranged at one side of the second body (2021); the second body (2021) is connected with the second middle cover in a sealed mode, and the second pressure control cavity (208) is formed between the second body (2021) and the second middle cover; the second water inlet hole (2014) is formed in the second sealing gasket (2012) in a penetrating mode, and the second sealing gasket (2012) is connected with between the second middle cover and the second body (2021); the second spring (2010) is arranged in the second pressure control cavity (208); the second top cover is connected with the second middle cover in a sealed mode, and the second pressure-relieving cavity is formed between the second top cover and the second middle cover; the second pressure-relieving channel (2016) comprises the second diversion hole (2016a) and the second pressure-relieving hole (2016b) which are all formed in the second middle cover; the second diversion hole (2016a) is capable of communicating the second pressure control cavity (208) with the second pressure-relieving cavity, and the second pressure-relieving hole (2016b) is capable of communicating the second pressure-relieving cavity with the seventh water outlet cavity (201d); the diameters of the second diversion hole (2016a) and the second pressure-relieving hole (2016b) are all greater than the diameter of the second water inlet hole (2014) which is formed in the second sealing gasket (2012) in a penetrating mode. The sixth driving part (203) further comprises the second piezoelectric element which is fixedly connected with the second top cover and is opposite to one side of the second middle cover, and the second piezoelectric element (203c) directly faces the water inlet end of the second pressure-relieving hole (2016b).

Similarly, the second positioning concave cavity is also arranged on the second top cover, and the opening of the second positioning concave cavity is connected with the deformable sealing piece (2025) in a sealed mode; the second piezoelectric element is arranged in the second positioning concave cavity, and one side of the second piezoelectric element is abutted against the sealing piece (2025); the rubber block used as the second limiting block which is used for limiting the deformation direction of the piezoelectric element is further arranged between the other side of the second piezoelectric element and the second top cover.

Different from the method adopted in the sixth embodiment in which the driving motor (203d) drives the rotary disk (2027) to rotate so as to communicate or block all pressure-relieving channels, the seventh embodiment adopts the method in which the first pressure-relieving channel (2015) is blocked by the first piezoelectric element (203c); the first piezoelectric element (203c) will deform and protrude in the direction of the first pressure-relieving hole (2015b) when being powered on, so that the first pressure-relieving channel (2015) is blocked; the first piezoelectric element (203c) will reset when being powered off, and then the first pressure-relieving channel (2015) is communicated. Similarly, the working principle at the second piezoelectric element is also the same, the states at the first pressure control cavity (207) and the second pressure control cavity (208) are controlled by the first piezoelectric element (203c) and the second piezoelectric element respectively so that the waterways can be switched and selected to open.

Eighth Embodiment

Figure 16:
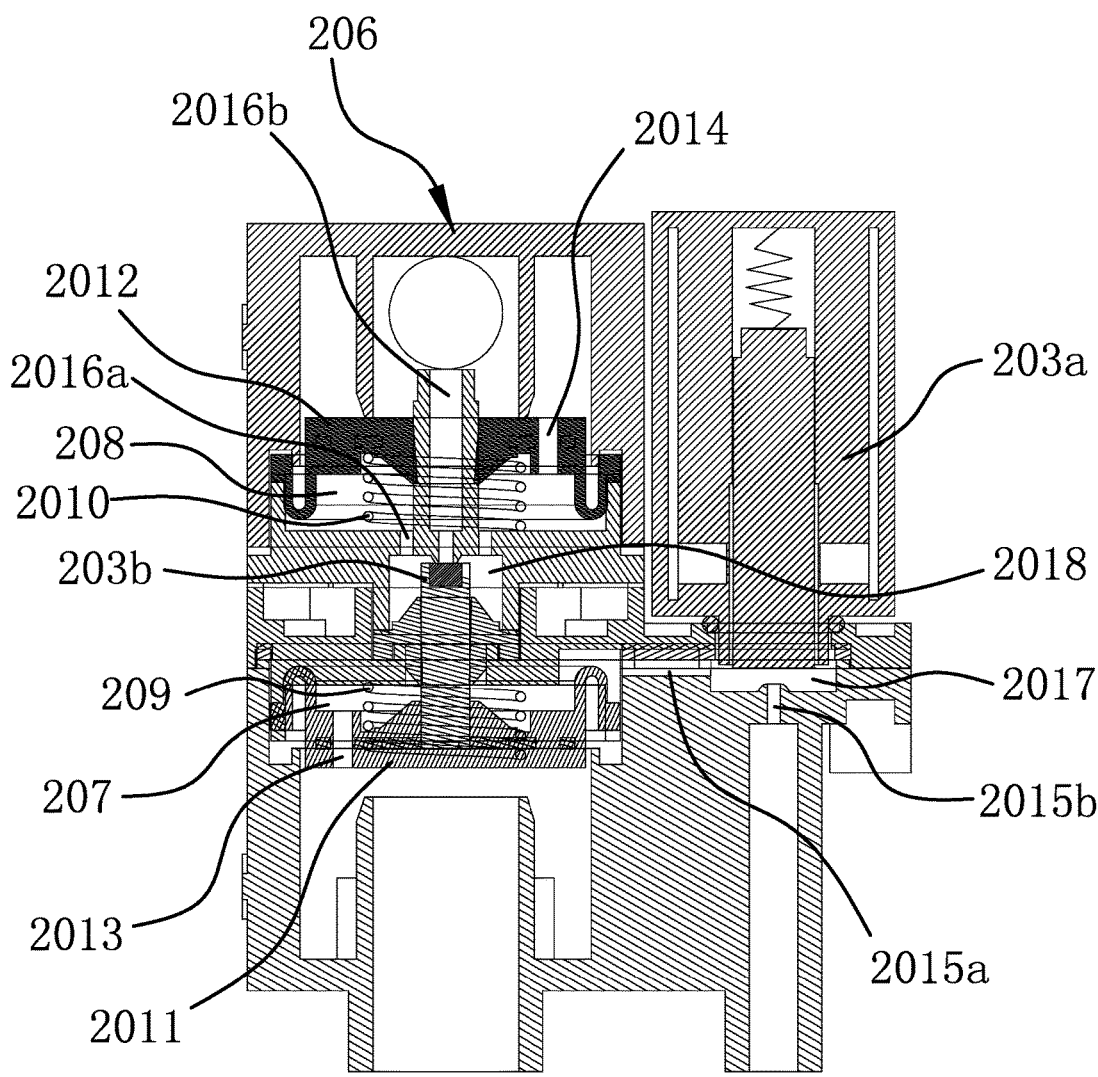
FIG. 16 shows a sectional view of the control assembly of the showerhead in an eighth preferred embodiment.
Figure 17:
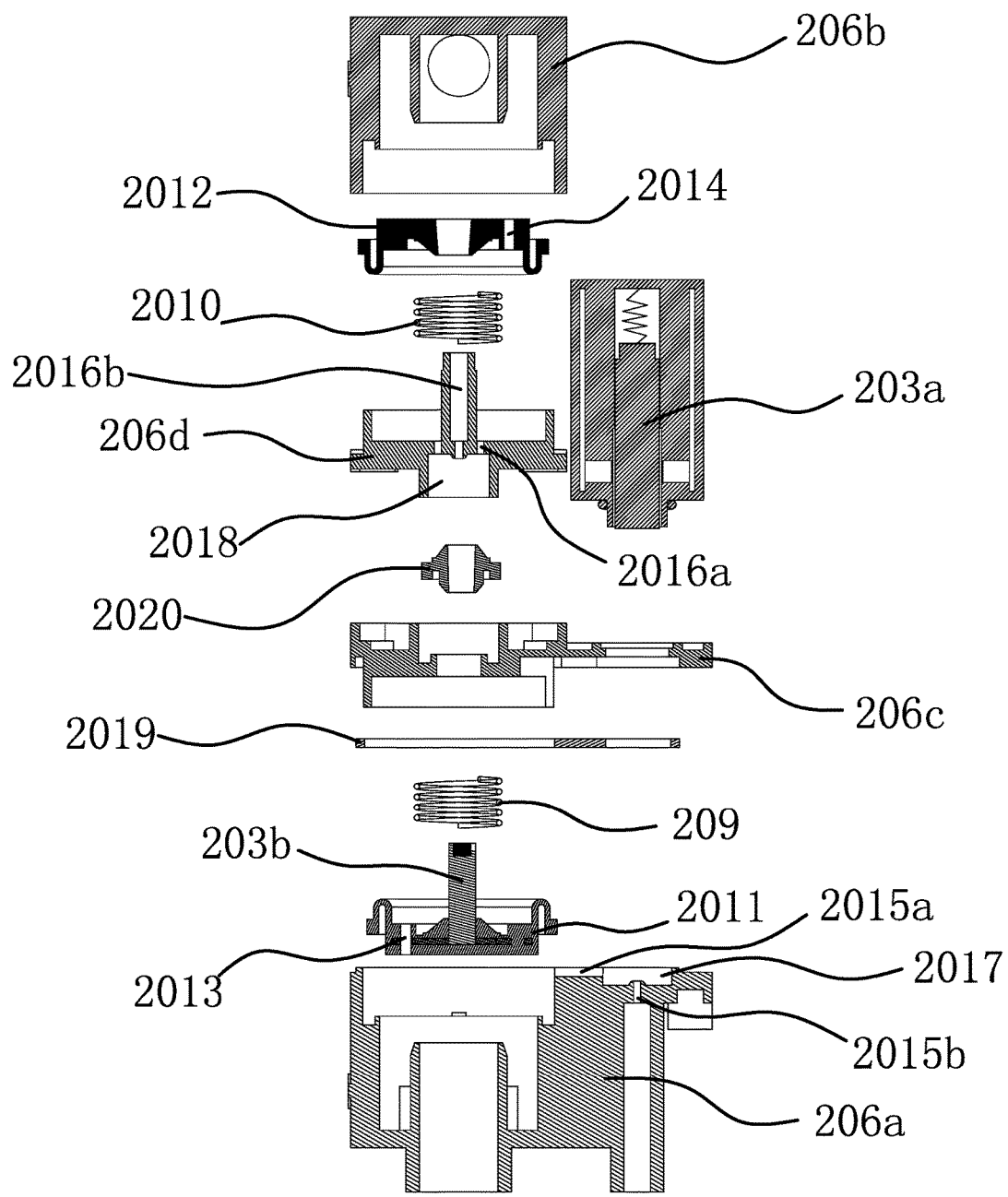
FIG. 17 shows an exploded view of the control assembly in a third preferred embodiment of the showerhead.

The structure and working principle in an eighth preferred embodiment are essentially the same as those in the sixth embodiment, but the differences are:

As shown in FIGS. 16 and 17, the outer side wall of the casing (206) of the control assembly is provided with the concave overflowing cavity (2017); the first pressure-relieving channel (2015) comprises the first diversion hole (2015a) and the first pressure-relieving hole (2015b); the first diversion hole (2015a) is capable of communicating the first pressure control cavity (207) to the side of the concave overflowing cavity (2017); the first pressure-relieving hole (2015b) communicates the sixth water outlet cavity (201c) to the bottom of the concave overflowing cavity (2017). The sixth driving part (203) comprises the electric element (203a) which is connected with the opening of the concave overflowing cavity (2017) in a sealed mode and is provided with the blocking part; when driven by electricity, the electric element (203a) can drive the blocking part to move towards the opening at the water inlet end of the first pressure-relieving hole (2015b) and then block the first pressure-relieving hole (2015b).

The first pressure control cavity (207) is arranged opposite to the second pressure control cavity (208); the sixth driving part (203) further comprises the rod-shaped plugging part (203b); one end of the plugging part (203b) is fixedly connected with one side, facing the second sealing gasket (2012), of the first sealing gasket (2011); the other end of the plugging part (203b) is opposite to the second pressure-relieving channel (2016), and the plugging part (203b) can move in the direction of the second pressure-relieving channel (2016) to block the second pressure-relieving channel (2016) when the first sealing gasket (2011) is away from the opening at the water inlet end of the sixth water outlet cavity (201c).

At the second pressure control cavity (208), the discharging cavity (2018) is further arranged in the casing (206); the second pressure-relieving channel (2016) comprises the second diversion hole (2016a) and the second pressure-relieving hole (2016b); the second diversion hole (2016a) is capable of communicating the second pressure control cavity (208) with the discharging cavity (2018); the second pressure-relieving hole (2016b) is capable of communicating the discharging cavity (2018) with the seventh water outlet cavity (201d); the diameters of the second diversion hole (2016a) and the second pressure-relieving hole (2016b) are all greater than the diameter of the second water inlet hole (2014) which is formed in the second sealing gasket (2012) in a penetrating mode. The other end of the plugging part (203b) extends into the discharging cavity (2018), and is opposite to the water inlet end of the second pressure relieving hole (2016b); the plugging part (203b) can move in the direction of the water inlet end of the second pressure relieving hole (2016b) to block the second pressure relieving hole (2016b) when the first sealing gasket (2011) is away from the opening at the water inlet end of the sixth water outlet cavity (201c).

The casing further comprises the first split shell (206a), the second split shell (206b), the first rubber cover (206c) and the second rubber cover (206d), wherein the first rubber cover (206c) and the second rubber cover (206d) are sequentially arranged between the first split shell (206a), the second split shell (206b); the first pressure control cavity (207) is formed between the first rubber cover (206c) and the first split shell (206a); the second pressure control cavity (208) is formed between the second rubber cover (206d) and the second split shell (206b); the discharging cavity (2018) is formed between the first rubber cover (206c) and the second rubber cover (206d). A through hole is further formed in the first rubber cover (206c) in a penetrating mode, and the plugging part (203b) can penetrate through the through hole; the first sealing ring (2019) is arranged between the first rubber cover (206c) and the first split shell (206a); the second sealing ring (2020) is arranged between the first rubber cover (206c) and the second rubber cover (206d); the outer side of the plugging part (203b) is sleeved with the second sealing ring (2020), and the inner side wall of the second sealing ring (2020) is abutted against the outer side wall of the plugging part (203b). In this embodiment, the electric element (203a) is a monostable electromagnet, and the blocking part is the end face at the outer end of the armature on the electromagnet; of course, based on the actual needs, the electric element (203a) can be replaced by a piezoelectric element or a bistable electromagnet.

When the control assembly is in the default state, the armature is retracted, and the first pressure-relieving hole (2015b) is opened; the water-discharging speed in the first pressure control cavity (207) is higher than the water-supplementing speed, and the water pressure gradually decreases; the first sealing gasket (2011) is subjected to the water pressure outside to overcome the elastic force of the first spring (209) and moves away from the opening at the water inlet end of the sixth water outlet cavity (201c); water at the water inlet end of the control assembly is discharged through the sixth water outlet cavity (201c). Meanwhile, the plugging part (203b) moves towards the second sealing gasket (2012) along with the first sealing gasket (2011) until the second pressure relieving hole (2016b) is blocked; water can only flow into the second pressure control cavity (208) and not the other way around; the second sealing gasket (2012) is abutted against the opening at the water inlet end of the seventh water outlet cavity (201d), and water does not flow out from the seventh water outlet cavity (201d). When switching the waterway, the armature is ejected out after receiving the power-on signal, and the first pressure-relieving hole (2015b) is blocked; at this moment, the coil is powered off, and the armature maintains in the ejected state. Then the first sealing gasket (2011) at the first pressure control cavity (207) gradually returns to the initial state, and the second sealing gasket (2012) at the second pressure control cavity (208) is opened so that the switching of waterways is achieved. For the structure in this embodiment, if switching of three waterways needs to be achieved, a structure which is similar to the aforementioned control assembly and provided with two water inlet ends and two water outlet ends can be further added, and the switching can be achieved by communicating the two water inlet ends of this control assembly to one water outlet end of the previous control assembly.

Different from the sixth and seventh embodiments, in the eighth embodiment, the electric element (203a) used as the sixth driving part (203) is arranged outside the casing (206) of the control assembly; compared to the structure in which the electric element (203a) is arranged in the casing (206), when it comes to the casing (206) of the control assembly, a power supply wire does not need to be introduced by drilling out a hole, so it is beneficial to the sealing effect, and water leakage can be effectively prevented; when it comes to the electric element (203a), the waterproof effect can be achieved without needing to arrange excessive sealing structures, and the probability where water leaks into the electric element (203a) or the power supply wire conducted with the electric element (203a) due to poor sealing effect is greatly lowered; therefore, the stable operation of the electric element (203a) is effectively guaranteed, and the service life is prolonged; the casing (206) of the whole control assembly does not need to be dismantled even if the electric element (203a) is damaged, and it can be replaced by directly dismantling the electric element (203a), so that the maintenance is convenient, and the operation cost is further lowered. Additionally, a certain amount of attractive force exerted on the outer side of the opening will usually be created at the water inlet end when water flows into the water inlet end, and repulsive force exerted on the outer side of the opening will usually be created at the water outlet end when water flows out of the water outlet end, therefore, the requirement for driving force is further lowered due to the fact that the electric element (203a) is controlled to block the opening at the water inlet end of the first pressure-relieving hole (2015b). Compared with the seventh embodiment, the switching between two waterways can be controlled by only arranging one electric element (203a) in the eighth embodiment, therefore, the energy consumption is lower.

The specific embodiments described in the specification are only for illustrations of the spirit of the invention. Various modifications, or supplementations, or adoption of similar methods as alternatives may be made to the preferred embodiments described in the invention by those skilled in the art without departing from the spirit of the invention or exceeding the scope defined in the appended claims.

LIST OF REFERENCE NUMERALS 1 outer shell
1a water inlet
1b water outlet holes
1c valve pocket
1d third sealing ring
1e sleeve
100 first body
2 first water inlet cavity
2a first water-passing hole
2b second water-passing hole
3 third water outlet cavity
4 first water outlet cavity
5 third pressure control cavity
6 third sealing gasket
6a third water inlet hole
7 third driving part
8 first switching core
8a first connecting part
8b first stress plate
8c concave cavity
9 first elastic part
10 first retaining shoulder
11 first sealing part
12 third pressure-relieving part
12a third pressure-relieving hole
13 third elastic part
14 third water inlet channel
15 third current-limiting column
16 third limiting head 17 fifth water outlet cavity
18 fifth pressure control cavity
19 fifth elastic part
20 fifth sealing gasket
21 fifth driving part
21a forth water-passing hole
22 second water inlet cavity
23 fourth water outlet cavity
24 second water outlet cavity
25 fourth pressure control cavity
26 fourth sealing gasket
27 fourth driving part
28 second switching core
29 second elastic part
30 power supply unit
31 first inductor
32 third water inlet cavity
33 fourth water inlet cavity
34 fifth water inlet cavity
35 first shell
36 second shell
37 water-passing pipe
201c sixth water outlet cavity
201d seventh water outlet cavity
203 sixth driving part
203a electric element
203b plugging part
203c first piezoelectric element
203d driving motor
204 second inductor
205 generator
206 casing
206a first split shell
206b second split shell
206c first rubber cover
206d second rubber cover
207 first pressure control cavity
208 second pressure control cavity
209 first spring
2010 second spring
2011 first sealing gasket
2012 second sealing gasket
2013 first water inlet hole
2014 second water inlet hole
2015 first pressure-relieving channel
2015a first diversion hole
2015b first pressure-relieving hole
2016 second pressure-relieving channel
2016a second diversion hole
2016b second pressure-relieving hole
2017 concave overflowing cavity
2018 discharging cavity
2019 first sealing ring
2020 second sealing ring
2021 second body
2022 first middle cover
2023 first head cover
2024 first positioning concave cavity
2025 sealing piece
2026 first limiting block
2027 rotary disk
2028 switching base
2029 discharging hole
2030 switching concave cavity

What is claimed is:

1. An inductive showerhead, comprising:
an outer shell (1) with a water inlet (1a) and multiple groups of water outlet holes (1b), each group of water outlet holes (1b) positioned differently;
an inside of the outer shell (1) with a first water inlet cavity (2) that communicates with the water inlet (1a);
a third water outlet cavity (3) and a first water outlet cavity (4) that are independent of each other, the third water outlet cavity (3) and the first water outlet cavity (4) each capable of communicating with corresponding groups of water outlet holes (1b) respectively;
a third water inlet cavity (32) arranged between the first water inlet cavity (2) and the third water outlet cavity (3), the first water inlet cavity (2) communicates with the third water inlet cavity (32);
a control assembly comprising a third pressure control cavity (5) located at a position where the third water inlet cavity (32) communicates with the third water outlet cavity (3) located at a position where the third water inlet cavity (32) communicates with the third water outlet cavity (3), the control assembly uses an electromagnet to control the third water inlet cavity (32) and the third water outlet cavity (3), allowing the third water inlet cavity (32) and the third water outlet cavity (3) to communicate with or to be blocked from each other;
a first inductor (31) and a power supply unit (30) that is used for supplying power to the electromagnet, the control assembly capable of blocking or connecting the third water inlet cavity (32) and the third water outlet cavity (3) based on an inductive signal from the first inductor (31);
a first switching core (8) located at a position where the first water inlet cavity (2) communicates with the first water outlet cavity (4); and
a tabular first stress plate (8b) and a first seal (11) arranged on the first switching core (8);
wherein the first stress plate (8b) is located at a position where the first water inlet cavity (2) communicates with the third water inlet cavity (32), and the first seal (11) is located at a position where the first water inlet cavity (2) communicates with the first water outlet cavity (4);
wherein when the first water inlet cavity (2) communicates with the third water outlet cavity (3) and water flows out, the first switching core (8) drives the first seal (11) to block the first water inlet cavity (2) from the first water outlet cavity (4) due to water pressure inside the first water inlet cavity (2); and
wherein when the first water inlet cavity (2) is blocked from the third water outlet cavity (3), the first switching core (8) drives the first seal (11) to move due to water pressure inside the first water inlet cavity (2), so that the first water inlet cavity (2) communicates with the first water outlet cavity (4).

2. The inductive showerhead of claim 1, further comprising:
a protruding annular first retaining shoulder (10) inside the outer shell (1) at a position where the first water inlet cavity (2) communicates with the first water outlet cavity (4);
wherein the first switching core (8) is arranged in the first retaining shoulder (10) in a penetrating mode;
wherein an inner end and an outer end of the first switching core (8) are positioned in the first water inlet cavity (2) and the first water outlet cavity (4) respectively;

the inner end of the first switching core (8) is provided with a tabular first stress plate (8b) that protrudes out of an outer side wall of the inner end;

the outer end of the first switching core (8) is fixedly connected with the first sealing part (11), which is capable of abutting against the first retaining shoulder (10) to achieve a sealing effect.

3. The inductive showerhead of claim 2, wherein the inside of the outer shell (1) is further provided with a first elastic part (9) with two ends that abut against the first stress plate (8b) and the first retaining shoulder (10) respectively; and wherein under elasticity of the first elastic part (9), the first switching core (8) is capable of driving the first sealing part (11) to abut against the first retaining shoulder (10) to achieve the sealing effect.

4. The inductive showerhead of claim 3, wherein the first switching core (8) includes a rod-shaped first connecting rod (8a) that is arranged in the first retaining shoulder (10) in the penetrating mode;

wherein the first stress plate (8b) is in a shape of a ring or a disk, and is coaxially arranged at an inner end of the first connecting rod (8a); and wherein the first sealing part (11) is fixedly connected with an outer side wall at an outer end of the first connecting rod (8a).

5. The inductive showerhead of claim 4, wherein an annular groove is formed in the outer side wall at the outer end of the first connecting rod (8a) surrounding an axis of the first connecting rod (8a); and wherein the first sealing part (11) is in a shape of a ring and is arranged inside the annular groove.

6. The inductive showerhead of claim 1, wherein the control assembly comprises, a third sealing gasket (6) that is connected to the third pressure control cavity (5), a third driving part (7), and a third pressure-relieving tube (12);

wherein the third pressure-relieving tube (12) is arranged in a middle of the third sealing gasket (6) in the penetrating mode, and an inner side wall of the third sealing gasket (6) is closely abutted against an outer side wall of the third pressure-relieving tube (12);

wherein an inner side of the third pressure-relieving tube (12) is a third pressure-relieving hole (12a) that is capable of being used for communicating the third pressure control cavity (5) with the third water outlet cavity (3);

wherein the third driving part (7) is capable of blocking an opening positioned at a side near the third pressure control cavity (5) on the third pressure-relieving hole (12a);

wherein a third water inlet channel (14) is formed in the third sealing gasket (6) in the penetrating mode, the third water inlet channel (14) capable of being used for communicating the first water inlet cavity (2) with the third pressure control cavity (5); and wherein a cross-sectional area of the third water inlet channel (14) is less than that of the third pressure-relieving hole (12a).

7. The inductive showerhead of claim 6, wherein a third water inlet hole (6a) is formed in the third sealing gasket (6) in the penetrating mode, the third water inlet hole (6a) capable of being used for communicating the third water inlet cavity (32) with the third pressure control cavity (5);

wherein the outer shell (1) is provided with a protruding third current-limiting column (15) that is arranged in the third water inlet hole (6a) in the penetrating mode; and wherein the third water inlet channel (14) is formed between an outer side wall of the third current-limiting column (15) and a side wall of the third water inlet hole (6a).

8. The inductive showerhead of claim 1, wherein the fifth water outlet cavity (17) is further arranged in the outer shell (1);

wherein the fifth water outlet cavity (17) is communicated with the corresponding group of the water outlet holes (1b);

wherein the fifth water inlet cavity (34) is arranged between the first water inlet cavity (2) and the fifth water outlet cavity (17);

wherein the first water inlet cavity (2) is communicated with the fifth water inlet cavity (34); the position where the fifth water inlet cavity (34) is communicated with the fifth water outlet cavity (17) is provided with the control assembly;

wherein the fifth water inlet cavity (34) can be communicated with or blocked from the fifth water outlet cavity (17) by the control assembly based on the inductive signal from the first inductor (31);

wherein when the first water inlet cavity (2) is communicated with the third water outlet cavity (3) or the fifth water outlet cavity (17) and the water flows out, the first switching core (8) can block the communication between the first water inlet cavity (2) and the first water outlet cavity (4); and wherein when the third water inlet cavity (32) is blocked from the third water outlet cavity (3), and the fifth water inlet cavity (34) is blocked from the fifth water outlet cavity (17), then the first switching core (8) can communicate the first water inlet cavity (2) with the first water outlet cavity (4) due to the water pressure inside the first water inlet cavity (2).

9. The inductive showerhead of claim 1, wherein the second water inlet cavity (22), the fourth water outlet cavity (23) and the second water outlet cavity (24) are further arranged in the outer shell (1);

wherein the fourth water outlet cavity (23) and the second water outlet cavity (24) are independent of each other;

wherein the water outlet end of the third water outlet cavity (3) or the first water outlet cavity (4) is communicated with the second water inlet cavity (22);

wherein the fourth water outlet cavity (23) and the second water outlet cavity (24) can be communicated with the corresponding groups of the water outlet holes (1b) respectively; the second water outlet cavity (33) is arranged between the second water inlet cavity (22) and the fourth water inlet cavity (23);

wherein the second water inlet cavity (22) is communicated with the fourth water inlet cavity (33);

wherein the position where the fourth water inlet cavity (33) is communicated with the fourth water outlet cavity (23) is provided with the control assembly, the fourth water inlet cavity (33) can be communicated with or blocked from the fourth water outlet cavity (23) by the control assembly based on the inductive signal from the first inductor (31); and wherein the position where the second water inlet cavity (22) is communicated with the second water outlet cavity (24) is further provided with the second switching core (28).

* * * * *